US011430186B2

(12) United States Patent
Solanki et al.

(10) Patent No.: US 11,430,186 B2
(45) Date of Patent: Aug. 30, 2022

(54) VISUALLY REPRESENTING RELATIONSHIPS IN AN EXTENDED REALITY ENVIRONMENT

(71) Applicant: Meta Platforms Technologies, LLC, Menlo Park, CA (US)

(72) Inventors: Saransh Solanki, Seattle, WA (US); Ken Brian Koh, Redmond, WA (US); Sean McCracken, Winter Garden, FL (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/248,018

(22) Filed: Jan. 5, 2021

(65) Prior Publication Data
US 2022/0215630 A1    Jul. 7, 2022

(51) Int. Cl.
*G06T 19/00*  (2011.01)
*G06F 3/16*  (2006.01)
*G10L 15/18*  (2013.01)
*G10L 15/22*  (2006.01)

(52) U.S. Cl.
CPC .............. *G06T 19/00* (2013.01); *G06F 3/167* (2013.01); *G10L 15/1815* (2013.01); *G10L 15/22* (2013.01); *G06T 2200/24* (2013.01); *G06T 2219/024* (2013.01)

(58) Field of Classification Search
None
See application file for complete search history.

(56) References Cited

U.S. PATENT DOCUMENTS

2021/0012113 A1*    1/2021    Petill ................... G06F 16/5866

* cited by examiner

*Primary Examiner* — Nicholas R Wilson
(74) *Attorney, Agent, or Firm* — Lee & Hayes, P.C.

(57) ABSTRACT

Techniques are described herein that enable a user to provide speech inputs to control an extended reality environment, where relationships between terms in a speech input are represented in three dimensions (3D) in the extended reality environment. For example, a language processing component determines a semantic meaning of the speech input, and identifies terms in the speech input based on the semantic meaning. A 3D relationship component generates a 3D representation of a relationship between the terms and provides the 3D representation to a computing device for display. A 3D representation may include a modification to an object in an extended reality environment, or a 3D representation of a concepts and sub-concepts in a mind map in an extended reality environment, for example. The 3D relationship component may generate a searchable timeline using the terms provided in the speech input and a recording of an extended reality session.

20 Claims, 16 Drawing Sheets

VISUALLY REPRESENTING RELATIONSHIPS IN AN EXTENDED REALITY ENVIRONMENT

BACKGROUND

Recent years have seen significant advancement in hardware and software platforms for generating and providing extended reality experiences. Indeed, extended reality (e.g., virtual reality, augmented reality, mixed reality, etc.) has grown in popularity, and technological advancements have facilitated its use in a variety of applications, such as gaming, online shopping, military training, and tourism. In some instances, conventional extended reality systems enable users to communicate with one another in an extended reality environment. However, conventional extended reality systems provide limited ability for users to collaborate in the extended reality environment.

Additionally, in some cases, conventional extended reality systems allow users to interact with objects in an extended reality environment, such as by using one or more controllers to select, move, add, or remove objects within the extended reality environment. However, interacting with objects in the extended reality environment in this way can be more cumbersome than interacting and collaborating with other users in the real world. This can cause frustration for users, especially when users want to utilize the full potential provided by the software of extended reality systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
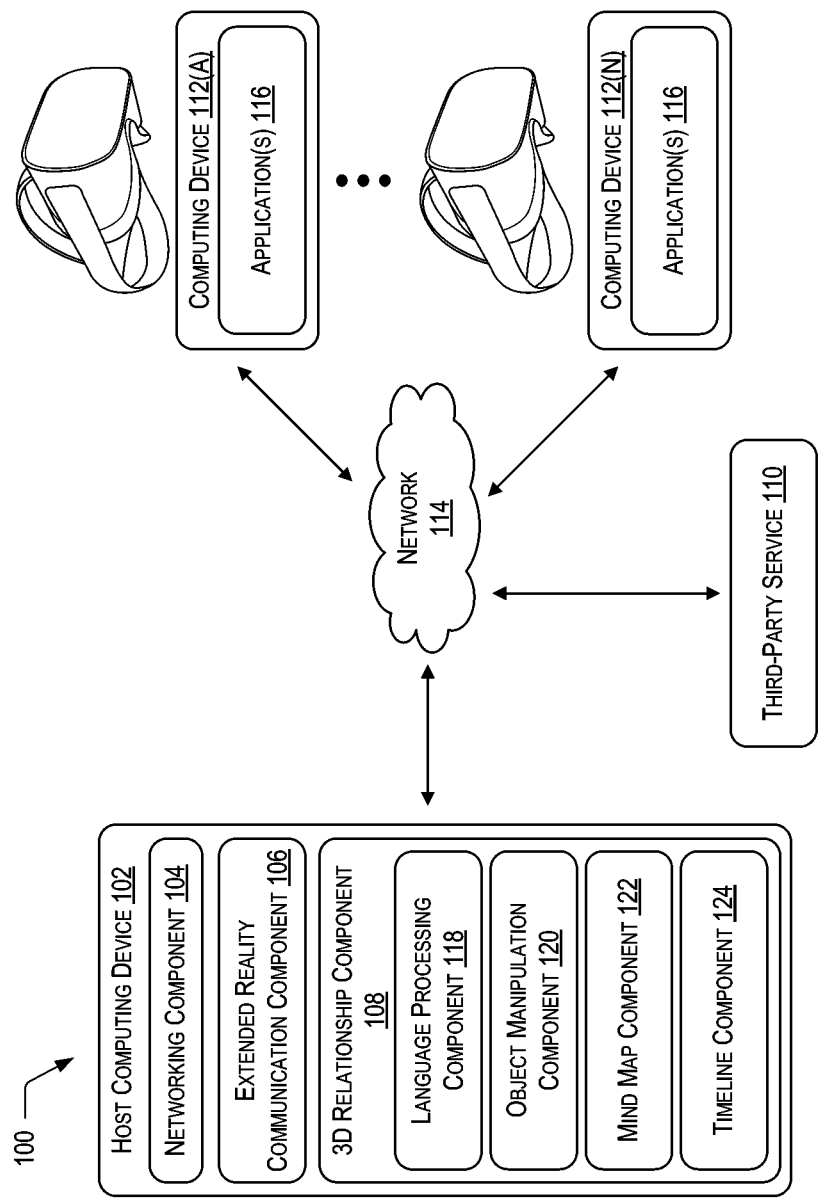
FIG. 1 is a schematic view of an example system usable to implement example techniques for visually representing relationships in an environment based on an input.

While conventional extended reality systems allow users to create, consume, and share content, they are not without limitations. In some cases, input mechanisms (e.g., handheld controllers) of conventional extended reality systems limit how users can interact and collaborate in an extended reality environment. For example, users of conventional extended reality systems often have to navigate through one or more menus to input commands using a hand-held controller to execute simple tasks, select individual letters on a keyboard using the hand-held controller to provide a custom input, and the like in an extended reality environment. These limited input mechanisms of conventional extended reality systems cause frustration for users who want to creatively interact and collaborate in an extended reality environment. Thus, the described techniques provide functionality beyond what is provided in conventional extended reality systems by allowing users to interact more naturally by, for example, providing speech inputs to control the extended reality environment, and visually representing relationships in the extended reality environment based on the speech inputs. Additional cues such as gaze direction, gesture, objects in the users' physical environments, and the like can also be used to supplement and/or disambiguate speech inputs.

This application describes techniques and features for visually representing relationships in an extended reality environment based on a natural user input, such as a speech input. As used herein, the term "virtual environment" or "extended reality environment" refers to a simulated environment in which users can fully or partially immerse themselves. For example, an extended reality environment can comprise virtual reality, augmented reality, mixed reality, etc. An extended reality environment can include objects and elements with which a user can interact. In many cases, a user participates in an extended reality environment using a computing device, such as a dedicated extended reality device. As used herein, the term "extended reality device" refers to a computing device having extended reality capabilities and/or features. In particular, an extended reality device can refer to a computing device that can display an extended reality graphical user interface. An extended reality device can further display one or more visual elements within the extended reality graphical user interface and receive user input that targets those visual elements. For example, an extended reality device can include, but is not limited to, a virtual reality device, an augmented reality device, or a mixed reality device. In particular, an extended reality device can include any device capable of presenting a full or partial extended reality environment. Nonlimiting examples of extended reality devices can be found throughout this application.

In some examples, an extended reality system may provide a representation of extended reality content (e.g., virtual reality (VR) content, augmented reality (AR) content, mixed reality (MR) content, etc.) to a computing device, such as an extended reality-compatible computing device. In other examples, the extended reality system may include or be implemented by an extended reality-compatible computing device. The extended reality system may receive, from the computing device, a speech input, and determine a semantic meaning of the speech input. For example, the extended reality system may utilize a neural network trained to determine semantic meaning from speech. In some instances, the extended reality system determines a first term from the speech input based on the semantic meaning of at least a first portion of the speech input, and determines a second term from the speech input based on the semantic meaning of at least a second portion of the speech input. The first term and the second term may define a relationship between objects, concepts, characteristics, and so forth in or to be presented in the extended reality environment. Accordingly, in examples, the extended reality system automatically generates a three-dimensional (3D) representation of a relationship between the first term and the second term. The extended reality system may provide the 3D representation to the computing device for presentation in the extended reality content. Therefore, in addition to (and/or in place of) input mechanisms of conventional extended reality systems, users can use speech inputs to control and modify an extended reality environment, giving users more freedom to interact with the extended reality environment.

In some examples, as mentioned above, the extended reality content comprises computer-generated content configured to be presented in association with at least one of a VR environment, an AR environment, or an MR environment.

In some examples, the extended reality content includes an object, and the extended reality system further associates the first term and the second term with the object. The extended reality system may modify, as a modified object, the object based at least in part on the first term and the second term, where the 3D representation is based at least in part on the modified object. Accordingly, users can modify characteristics, locations, presence, and so forth of objects in an extended reality environment using speech inputs.

In some examples, the extended reality system receives, from the computing device, an indication of a direction of a gaze and/or of a pose of a user relative to the extended reality content. The extended reality system may determine that the object is in a path associated with the direction of the gaze or of the pose. In examples, the extended reality system associates the first term and the second term with the object based at least in part on determining that the object is in the path associated with the direction of the gaze or of the pose. Using gaze and/or pose as an additional input may refine actions taken by the extended reality system in tandem with the speech input, such as to discern which one of multiple objects the user is referencing in the speech input, to determine an object that a pronoun included in the speech input is referring to, and so on.

In some examples, at least one of the first term or the second term refers to a portion of the object, and a different one of the first term or the second term refers to a modification of the object.

In some examples, the 3D representation comprises a mind map based on a central concept associated with the first term, and a sub-concept associated with the second term. The 3D representation may visually distinguish the central concept from the sub-concept, such as by spacing the central concept from the sub-concept, forming a line from the central concept to the sub-concept, and the like.

In some examples, the sub-concept is a first sub-concept, and the extended reality system further determines a third term from the speech input and based at least in part on the semantic meaning. The extended reality system may then determine a second sub-concept associated with the third term, where the second sub-concept is different than the first sub-concept. In some instances, the extended reality system modifies the mind map to include the second sub-concept such that the 3D representation visually distinguishes the second sub-concept from the central concept and the first sub-concept. In this way, the extended reality system may construct a mind map having multiple sub-concepts associated with a central concept as a discussion or monologue progresses, without necessarily requiring additional input from the user other than speech.

In some examples, the extended reality system determines an object associated with the concept or the sub-concept. For example, the extended reality system may store a variety of 3D objects and terms associated with the 3D objects, and map a term from the speech input to a term associated with a stored 3D object. The extended reality system generates the 3D representation by incorporating the object into the mind map at a location associated with the concept or the sub-concept on the mind map. Therefore, the mind map may include 3D objects related to concepts in place of (or in addition to) words associated with a concept, which may make the mind map easier to navigate and understand for users in subsequent extended reality sessions viewing the mind map.

In some examples, the extended reality system determines a first time associated with the first term in the speech input, and a second time associated with the second term in the speech input. In some cases, the extended reality system generates a timeline based at least in part on the first time and the second time, and causes presentation of the timeline in association with the 3D representation. For instance, the first term and the second term may be indicated with corresponding visual representations along the timeline at which they occurred, so a user can view when the terms were spoken during an extended reality session.

In some examples, the computing device is a first computing device, and the extended reality system generates a recording associated with at least the first term and a user of the first computing device. For example, the extended reality system may generate a tag that includes the first term and the user that spoke the term, and associate the tag with a time in an extended reality session at which the term was spoken by the user. In some instances, the extended reality system receives, from the first computing device or a second computing device, a search input comprising a search term. For instance, the search input may be a speech input that includes the search term. The extended reality system may then associate the search term with at least one of the first term or the user, such as by mapping one or more terms in the search input to the first term or a name associated with the user. In examples, the extended reality system provides to the first computing device or the second computing device from which the search input was received and in response to receiving the search input, the recording to be presented via the computing device from which the search input was received. For example, the extended reality system may cause the computing device from which the search input was received to display a portion of an extended reality session associated with the term and/or spoken by a particular user.

In some examples, the computing device is a first computing device associated with a first user, the speech input is a first speech input spoken by the first user, and the semantic meaning is a first semantic meaning. The extended reality system may receive, from a second computing device, a second speech input spoken by a second user, such as another user participating in an extended reality session. In examples, the extended reality system determines a second semantic meaning of the second speech input, and generates the 3D dimensional representation based on the second semantic meaning of the speech input. Therefore, the extended reality system may visually represent relationships in an extended reality environment using inputs from multiple users, such as ongoing during a discussion between the users, where the users do not need to stop their discussion to document the discussion along the way.

In this way, the extended reality system allows users to create, navigate, modify, and so on in an extended reality environment without being limited by the controls of conventional extended reality systems. By allowing users to use speech inputs in addition to (or in place of) hand-held controllers, along with incorporating the user's gaze for context in some cases, users have greater control over extended reality environments and can execute actions more efficiently than in conventional systems. Further, the extended reality system can operate more efficiently than conventional systems. For instance, the extended reality system can improve the efficiency of using a computing device by executing spoken actions directly, thus reducing (or in some cases, eliminating) user interaction with menus and/or keyboards in the extended reality environment. By providing visually representing relationships based on speech inputs provided by users of an extended reality system, the extended reality system can reduce the interactions required by a user in order to communicate with another user, manipulate objects in an extended reality environment, and/or create a mind map, to name a few examples. Thus, the extended reality system can reduce the amount of computing resources used to process such user interactions and commands.

These and other aspects are described further below with reference to the accompanying drawings. The drawings are merely example implementations and should not be construed to limit the scope of the claims. For example, while examples are illustrated in the context of a user interface for a mobile device, the techniques may be implemented using any computing device and the user interface may be adapted to the size, shape, and configuration of the particular computing device.

Example System Architecture

FIG. 1 is a schematic view of an example system 100 usable to implement example techniques for visually representing relationships in an environment based on input via the system 100. The example system 100 includes a host computing device 102 that includes a networking component 104, an extended reality communication component 106, and a three-dimensional (3D) relationship component 108. The system 100 may include a third-party service 110, and computing devices 112(A), . . . 112(N) (collectively "computing devices 112"). In this example, A and N are non-zero integers greater than or equal to 1.

The host computing device 102, the third-party service 110, and the computing device(s) 112 are communicatively coupled to one another via a network 114. The network 114 may be representative of any one or more communication networks, including fiber optic, cable, public switched telephone, cellular, satellite, wide area, local area, personal area, and/or any other wired and/or wireless networks. Although the system 100 of FIG. 1 is depicted as having a particular number of components, the system 100 can have any number of additional or alternative components (e.g., any number of host computing devices, client devices, third-party services, and/or other components in communication with one another via one or more networks). Any or all of the components (e.g., the host computing devices, the third-party services, and/or the computing devices 112) may include one or more processors and memory storing computer executable instructions to implement the functionality discussed herein attributable to the various computing devices.

In some examples, the system 100 may facilitate communication between users via an extended reality environment (e.g., virtual reality, mixed reality, augmented reality, or other computer-generated environment). For example, the computing devices 112 may include one or more display devices (e.g., display screens, projectors, lenses, head-up displays, etc.) capable of providing an extended reality display. By way of example and not limitation, computing devices 112 may comprise wearable computing devices (e.g., headsets, glasses, helmets, or other head-mounted displays, suits, gloves, watches, etc.), handheld computing devices (e.g., tablets, phones, handheld gaming devices, etc.), portable computing devices (e.g., laptops), or stationary computing devices (e.g., desktop computers, televisions, set top boxes, vehicle display, head-up display, etc.). The computing devices 112 may be implemented as standalone computing devices comprising substantially all functionality in a single device, or may be coupled via wired or wireless connection to one or more other computing devices (e.g., PCs, servers, gateway devices, coprocessors, etc.), peripheral devices, and/or input/output devices.

The computing devices 112 may store and/or execute one or more applications 116, such as operating systems, a web browser, or other native or third-party applications (e.g., social media applications, messaging applications, email applications, productivity applications, games, etc.). The applications 116 may execute locally at the computing devices 112 and/or may communicate with one or more other applications, services, or devices over the network 114. For instance, the computing devices 112 may execute one or more of the applications 116 to interface with the networking component 104, the extended reality communication component 106, and/or the 3D relationship component 108 of the host computing device 102. Additionally or alternatively, the computing devices 112 may execute one or more of the applications 116 to interface with functionality of the third-party service 110.

The host computing device 102 can generate, store, receive, and/or transmit data, such as networking data, communications data, extended reality data, and/or application data. For example, the host computing device 102 can receive user input from and/or output data to one or more of the computing devices 112. As shown in FIG. 1, the host computing device 102 includes a networking component 104. In some examples, the networking component 104 can provide a digital platform that includes functionality through which users of the networking component 104 can connect to and/or interact with one another. For example, the networking component 104 can register a user (e.g., a user of one of the computing devices 112) to create an account for the user. The networking component 104 may, with input from a user, create and store a user profile associated with the user. The user profile may include demographic information, communication channel information, and information on personal interests of the user. The user profile information may additionally or alternatively include, for example, biographic information, demographic information, behavioral information, the social information, or other types of descriptive information, such as work experience, educational history, hobbies or preferences, interests, affinities, or location. Interest information may include interests related to one or more categories, which may be general or specific. As an example, if a user "likes" an article about a brand of shoes, the category may be the brand.

The networking component 104 can further provide features through which the user can connect to and/or interact with other users. For example, the networking component 104 can provide messaging features and/or chat features through which a user can communicate with one or more other users. The networking component 104 can also generate and provide groups and communities through which the user can associate with other users.

Also, the networking component 104 may allow users to post photographs and other multimedia content items to a user's profile page (typically known as "wall posts" or "timeline posts") or in a photo album, both of which may be accessible to other users of the social networking component depending on the user's configured privacy settings. Herein, the term "friend" may refer to any other user of the social networking component with which a user has formed a connection, association, or relationship via the social networking system.

Authorization services may be used to provide and enforce one or more privacy settings of the users of the networking component 104. A privacy setting of a user determines how particular information associated with a user can be shared. The authorization services may allow users to opt in to or opt out of having their actions logged by the networking component 104 or shared with other applications (e.g., extended reality communication component 106, 3D relationship component 108, applications 116) or devices (e.g., the third-party service 110), such as, for example, by setting appropriate privacy settings.

In some examples, networking component 104 comprises a social networking service (such as but not limited to Facebook™, Instagram™, Snapchat™, LinkedIn™, etc.). Alternatively or additionally, the networking component 104 may comprise another type of system, including but not limited to an e-mail system, search engine system, e-commerce system, gaming system, banking system, payment system, or any number of other system types with which users have accounts. In examples in which the networking component 104 comprises a social networking system, the networking component 104 may include a social graph system for representing and analyzing a plurality of users and concepts. A node storage of the social graph system can store node information comprising nodes for users, nodes for concepts, and nodes for items. An edge storage of the social graph system can store edge information comprising relationships between nodes and/or actions occurring within the social networking system. Further detail regarding social networking systems, social graphs, edges, and nodes is presented below with respect to FIG. 16.

The host computing device 102 in this example includes the extended reality communication component 106. In some examples, the extended reality communication component 106 utilizes the host computing device 102 to enable users to communicate with one another in an extended reality communication session. For example, the extended reality communication component 106 can utilize the host computing device to receive user input corresponding to a particular co-user and send an invitation to join an extended reality communication session to an extended reality device corresponding to the co-user.

For example, the extended reality communication component 106, via host computing device 102, generates an extended reality lobby graphical user interface element for display on an extended reality device (e.g., one of the computing devices 112) associated with a user of a networking system. The extended reality communication component 106 further, via host computing device 102, determines a connection (e.g., on the social graph) between the user and a co-user. Based on the connection, the extended reality communication component 106 provides a computer-generated visual representation (e.g., avatar) of the co-user for display within the extended reality lobby visible via the extended reality lobby graphical user interface element displayed on the extended reality device associated with the user. Via the host computing device 102, the extended reality communication component 106 receives user input targeting the computer-generated visual representation of the co-user and generates and sends an invitation to join an extended reality communication session for display on an extended reality device associated with the co-user.

The host computing device 102 in this example includes the 3D relationship component 108. The 3D relationship component 108 in the illustrated example includes a language processing component 118, an object manipulation component 120, a mind map component 122, and a timeline component 124. In some examples, the 3D relationship component 108 receives an input from one of the computing devices 112, and generates a 3D visual representation of a relationship in an extended reality environment based at least in part on the speech input by leveraging various functionality described below of the language processing component 118, the object manipulation component 120, the mind map component 122, and/or the timeline component 124. While many of the examples herein refer to an input received by the 3D relationship component 108 and/or the language processing component 118 as a speech input, other types of inputs are considered as well, such as gaze tracking, head position, gesture inputs, controller inputs, and other forms of input. In some cases, different and/or multiple inputs may be interpreted by the 3D relationship component in tandem with one another to discern meaning of the multiple inputs, such as by associating a path of a gaze of a user of the computing device 112(A), and/or associating a path of a pose (e.g., as indicated by pointing with or without a handheld controller) with a speech input. Other combinations of different and/or multiple inputs are also considered.

For example, the language processing component 118 may receive a speech input from a computing device 112(A) via the network 114. For instance, the computing device 112(A) may include one or more microphones that capture sound in an environment surrounding the computing device 112(A). The computing device 112(A) may transmit a signal corresponding to the sound captured by the microphone(s) to the language processing component 118. In examples, the language processing component 118 may determine that the sound represented by the signal includes speech. Speech detected from such a signal is referred to herein as a "speech input."

In some instances, the language processing component 118 determines a semantic meaning from the speech input. To determine the semantic meaning, the language processing component 118 may leverage one or more machine-learned models. For instance, the language processing component 118 may input the speech input (and/or a transcription thereof) into a deep neural network, where the deep neural network is trained to determine a semantic meaning of the speech input. In some cases, the deep neural network may also determine a context of multiple speech inputs, such as during a conversation between users of multiple of the computing devices 112 during a shared extended reality session.

The deep neural network may determine lexical semantics of the speech inputs, thus determining a computational meaning of individual words in the context of the speech input; terminology extraction to automatically extract relevant terms from the speech input; and/or word sense disambiguation to select a meaning of a word that makes the most sense in the context of the speech input. Alternatively or additionally, the deep neural network may perform relationship extraction to determine, from a corpus of speech inputs, a relationship among entities (e.g., a relationship that is not explicitly named in the speech inputs); may perform semantic role labeling to identify and disambiguate semantic predicates, then identify and classify the elements of the semantic predicates; performing conference resolution to determine which words refer to the same entities; and/or perform discourse analysis to determine the nature of the discourse relationships between sentences.

Additionally, in some scenarios, the language processing component 118 may "learn" the semantic meaning of new words or phrases by tracking actions taken by user(s) of the computing device(s) 112 in an extended reality environment over time. In an illustrative example, a user of the computing device 112(A) may provide a speech input that includes "Pass me the widget," and a user of the computing device 112(N) may select an object in an extended reality environment and move the object to the user of the computing device 112(A). If the language processing component 118 does not have a previous semantic meaning for "widget," (and/or has a different semantic meaning for "widget" than the object that was passed), the language processing component 118 may assign the term "widget" to the object that was passed. When the term "widget" is used in future extended reality sessions, the language processing component 118 may rely on this semantic meaning associated with the object to search for the same or similar objects that are being referenced in the extended reality environment.

A similar technique may be employed by the language processing system 118 for action terms (e.g., verbs) provided by a user of any of the computing devices 112 and previously unknown to the language processing component 118 as well. For example, the user of the computing device 112(A) may provide a speech input that includes "Do a swizzle with the widget," where the user of the computing device 112(N) subsequently performs an action with the widget, such as by moving the widget in a specific manner in the extended reality environment. If the language processing component 118 does not have a previous semantic meaning for "swizzle," (and/or has a different semantic meaning for "swizzle" than the action that was performed with the widget), the language processing component 118 may assign the term "swizzle" to the action that was performed with the widget. When the term "swizzle" is used in future extended reality sessions, the language processing component 118 may rely on this semantic meaning associated with the action to perform a similar action the extended reality environment with an object. Other examples are also considered of functionality employed by the language processing component 118 to determine a semantic meaning of the speech input.

In some examples, the language processing component 118 determines whether the speech input corresponds to manipulating one or more objects in an extended reality environment, whether the speech input corresponds to creation or modification of a mind map in the extended reality environment, or navigation or modification of a timeline of an extended reality session, among other examples. For example, the language processing component 118 may determine that a speech input corresponds to modifying a mind map based on a determination that the computing device 112(A) is utilizing an application 116 for brainstorming. In another example, the language processing component 118 may determine that a speech input corresponds to adding an object to an extended reality environment based on a determination that the computing device 112(A) is utilizing an application 116 that simulates interior design of spaces in the extended reality environment.

Based on the semantic meaning, and in some cases a determination of the application 116 being executed by the computing device 112(A) when the speech input was received, the language processing component 118 determines terms from the speech input that represent a relationship. For instance, in the case of the computing device 112(A) executing a brainstorming application, the language processing component 118 determines relationships between concepts to be included in a mind map. To illustrate, the language processing component 118 may receive a speech input that includes "Let's talk about the size and shape of the new widget." In response, the language processing component 118 may determine that "widget" is a concept of a mind map during a brainstorming session, and "size" and "shape" are sub-concepts related to the "widget" concept.

In examples, the language processing component 118 provides the terms to one or more of the object manipulation component 120, the mind map component 122, or the timeline component 124 to automatically generate a 3D visual representation of the relationship between the terms. For instance, the object manipulation component 120 may receive an indication of an object in an extended reality environment as a first term, and an action to manipulate the object as a second term. Based on the first term and the second term, the object manipulation component 120 generates the representation of the action to be performed relative to the object in three dimensions in the extended reality environment. In an illustrative example, a speech input may include "Put a hat on the avatar," where the terms provided by the language processing component 118 to the object manipulation component 120 are "put," "hat," and "avatar." The object manipulation component 120 can generate a 3D representation of the terms by selecting a VR hat object from an object library (not pictured) of the host computing device 102, and causing the VR hat object to appear on an avatar in an extended reality environment being presented to a user via the computing device 112(A).

As described above, the language processing component 118 may provide terms to the mind map component 122 as well. For example, the mind map component 122 may receive an indication of a concept of a mind map as a first term, and a sub-concept related to the concept as a second term. Based on the first term and the second term, the mind map component 122 generates the representation of the sub-concept relative to the concept in three dimensions in the extended reality environment. In an illustrative example, a speech input may include "Basketball and soccer are types of sports," where the terms provided by the language processing component 118 to the object manipulation component 120 are "sports," "basketball," and "soccer." The mind map component 122 can generate a 3D representation of the terms by placing the term "sports" at a center of the mind map as a central concept of the mind map. Additionally, the mind map component 122 generates the 3D representation by placing the terms "basketball" and "soccer" spaced apart from one another and spaced apart from the central concept "sports" in three dimensions in an extended reality environment being presented to a user via the computing device 112(A).

In some examples, the timeline component 124 may use the terms to generate a tagged timeline for an extended reality session. For instance, the timeline component 124 may determine times associated with the terms in the speech input, e.g., times at which the terms were spoken in the speech input. In some cases, the timeline component 124 causes presentation of the timeline in association with the 3D representation. For example, the mind map component 122 may distinguish different sub-concepts of a mind map with different colors, and the timeline component 124 may generate the timeline including indicators at which each of the sub-concepts were mentioned, where each indicator on the timeline is displayed in the color corresponding to the color on the mind map.

The timeline component 124 may also use one or more of the terms to search the timeline of the extended reality session to view one or more portions of a recording of the extended reality session. As just described, the timeline component 124 may tag locations in a timeline of an extended reality session at which the terms were spoken. The timeline component 124 may include additional information in the tag as well, such as a speaker who uttered the speech input, synonyms or similar terms for the terms that were uttered in the speech input, and the like.

Upon receiving a search input comprising a search term from the computing device 112(A), the timeline component 124 may associate the search term to a term included in a tag in the timeline, such as by mapping the search term to the term tagged in the timeline, a speaker of the term tagged in the timeline, a synonym of the term tagged in the timeline, and so forth as a search result. The timeline component 124 may then provide a portion of the recording of the extended reality session corresponding to the search result to the computing device 112(A) that provided the search input. The timeline component 124 may provide emphasis on various aspects of the extended reality environment that correspond to the search term. For example, the timeline component 124 may provide a "spotlight" effect on a particular speaker searched for in the search term, may provide the spotlight effect on an object in an environment searched for in the search term, may emphasize words in a mind map searched for in the search term (e.g., by highlighting, bolding, italicizing, etc.), and so forth.

The 3D relationship component (and the components associated therewith) may be configured to visually represent relationships based on speech inputs from a single user or multiple users. For example, the language processing component 118 may receive a first speech input from a first user of the computing device 112(A) to "create a dining room space" in an extended reality environment. Based on this first speech input and terms extracted by the language processing component 118, the object manipulation component 120 provides a virtual dining room to the first user via the computing device 112(A) and a second user of the computing device 112(N) who is also present in the extended reality environment. The language processing component 118 may then receive a second speech input from the second user to "put some flowers on the table." The language processing component 118 determines a second semantic meaning of the second speech input using the techniques described herein. The language processing component 118 provides the terms from the semantic meaning to the object manipulation component 120 to select an appropriate object from the object library and add the object to the extended reality environment based on the determined relationship with the table. In this way, multiple users can leverage the capabilities of the 3D relationship component to collaboratively create visual relationships in extended reality environments using speech inputs.

While the 3D relationship component 108, the language processing component 118, the object manipulation component 120, the mind map component 122, and the timeline component 124 are shown in this example as separate components of the host computing device 102, in other examples, any of these components may be a sub-component or feature of the extended reality communication component 106, the computing devices 112, the third-party service 110, or another device not pictured in the system 100.

In some examples, the third-party service 110 stores and/or provides access to various third-party sources of digital data. For example, the third-party service 110 can be accessed by the host computing device 102 and/or the computing devices 112 to provide functionality by which the host computing device 102 and/or computing devices 112 can generate, access, view, search for, and/or interact with digital data. In some instances, the third-party service 110 includes a database storing digital files (e.g., digital documents, digital images, digital videos, etc.). In some examples, the third-party service 110 includes a search engine that provides search results in response to receiving a search query, another social networking service, a gaming service, an e-commerce marketplace, a payment service, a banking service, a remote digital storage service, a cloud computing service, or any other third-party platform hosting one or more services that are accessibly by the host computing device 102 and/or computing devices 112 via the network 114.

The networking component 104, the extended reality communication component 106, and/or the 3D relationship component 108 can be implemented or hosted by any one or combination of computing devices of the system 100. For example, while FIG. 1 illustrates the networking component 104, the extended reality communication component 106, and/or the 3D relationship component 108 being implemented by the host computing device 102, any or all of these components can be implemented in whole or in part by a different computing device (e.g., one or more of the computing devices 112, the third-party service 110, or any combination thereof). For instance, the networking component 104, the extended reality communication component 106, and/or the 3D relationship component 108 may be implemented or hosted in a distributed computing arrangement with portions of the respective component(s) being executed on multiple different computing devices.

Object Manipulation Using Speech Input

Figure 2:
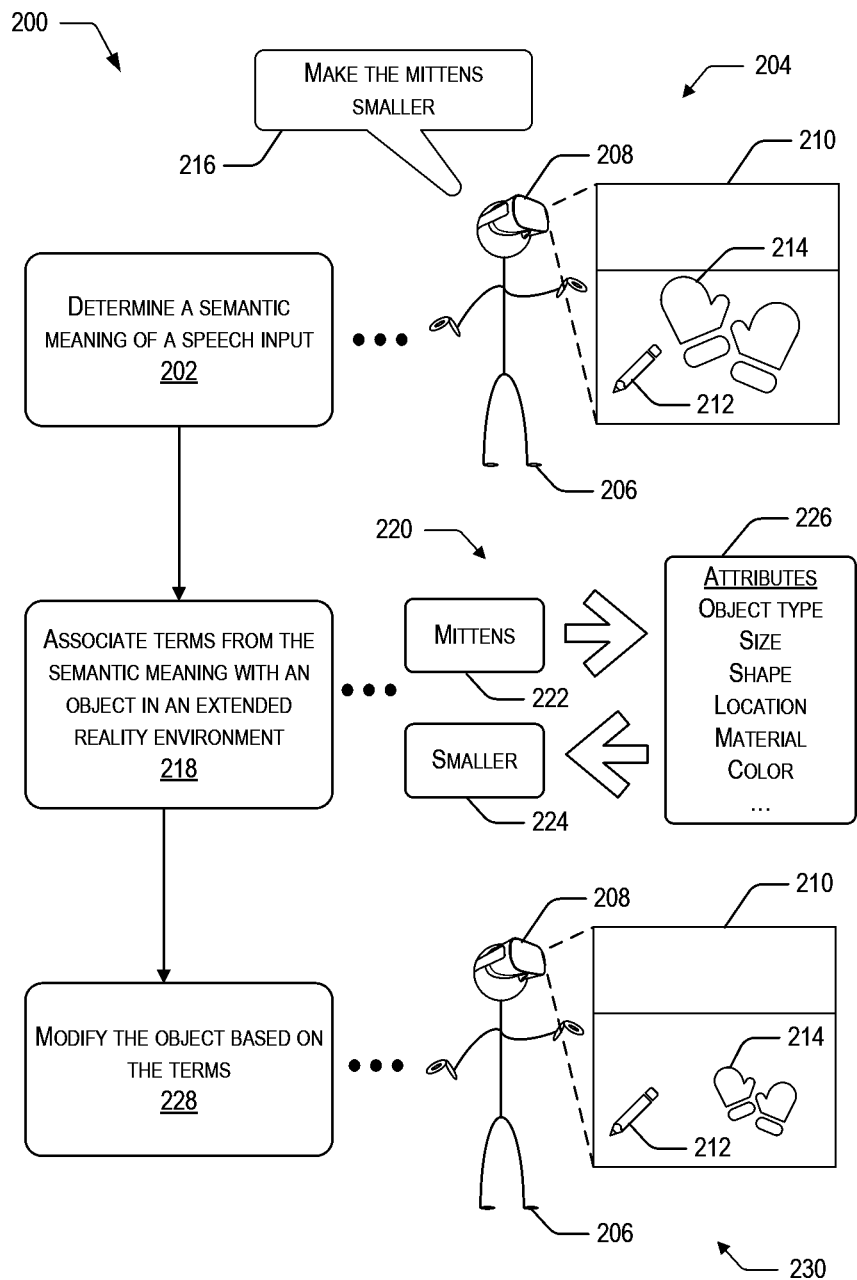
FIG. 2 is a pictorial flow diagram for modifying an object in an extended reality environment using an input using the techniques described herein.

FIG. 2 is a pictorial flow diagram 200 for modifying an object in an extended reality environment using an input using the techniques described herein. Reference will be made to components included in the example system 100 of FIG. 1 in the description of the pictorial flow diagram 200.

An operation 202 includes determining a semantic meaning of a speech input. For example, an environment 204 includes a user 206 wearing an extended reality device 208. The extended reality device 208 may correspond to any of the computing devices 112 of FIG. 1. The extended reality device 208 may be presenting an extended reality environment 210 to the user 206 via a display in a headset of the extended reality device 208. In the illustrated example, the extended reality environment 210 includes various virtual objects, in this case a pencil 212 and mittens 214.

As shown in the environment 204, the user 206 has provided a speech input 216 that includes "Make the mittens smaller." In some examples, the speech input 216 is captured by a microphone of the extended reality device 208 and provided to the language processing component 118 of FIG. 1. The language processing component 118 determines a semantic meaning of the speech input 216. For example, the language processing component 118 may utilize a deep neural network to determine parts of speech of the speech input 216, such as nouns, verbs, adjectives, and so forth, along with definitions of the words included in the speech input 216, and/or how the order of the words in the speech input 216 affect the semantic meaning In the illustrated example, the language processing component 118 may determine that the speech input 216 is a command based on the inclusion of the word "make." Further, the language processing component 118 may identify the noun "mittens," along with the adjective "smaller," as terms to be used modify an object in the extended reality environment 210.

Additionally, in some examples, the language processing component 118 may utilize inputs other than the speech input 216 to determine the semantic meaning, such as a gaze of the user 206 in the extended reality environment 210. For instance, the language processing component 118 may determine that the user 206 is referencing the mittens 214 that are in a path of the gaze of the user 206, rather than a different pair of mittens that are not in the path of the gaze of the user 206.

An operation 218 includes associating terms from the semantic meaning with an object in an extended reality environment. As discussed above, the language processing component 118 may provide terms from the speech input 216 to the object manipulation component 120 to manipulate one or more objects in the extended reality environment 210. A schematic illustration 220 provides an example of how the language processing component 118 defines terms from the speech input 216 and how the object manipulation component 120 uses the terms.

For example, the language processing component 118 provides a term 222 of "mittens" and a term 224 of "smaller" from the speech input 216 to the object manipulation component 120. The object manipulation component 120 may identify the mittens 214 as an object in the speech input 216 that is to be manipulated. In examples, the object manipulation component 120 may determine attributes 226 of the mittens 214 that can be manipulated in the extended reality environment 210. For instance, the attributes 226 may be stored in association with the mittens 214, where different objects in the extended reality environment 210 may have different attributes that can be manipulated. The object manipulation component 120 may associate the term 224 with a size attribute from the attributes 226. In examples, the object manipulation component 120 changes the attribute of the object, in this case the mittens 214, based on the term 224. For instance, the object manipulation component 120 determines a relationship between the term 222 and the term 224 to represent in three dimensions in the extended reality environment 210.

An operation 228 includes modifying the object based on the terms. For instance, an environment 230 may correspond to the environment 204 after the object manipulation component 120 has provided an instruction to the extended reality device 208 to modify the mittens 214 based on terms 222 and 224 identified in the speech input 216. In the illustrative example, the object manipulation component 120 uses the relationship of the term 222 with the term 224 to change an attribute of the mittens 214, thus making the dimensions of the mittens 214 smaller in three dimensions in the extended reality environment 210. In this way, the user 206 can quickly and easily modify the extended reality environment 210 using natural language speech inputs, without having to navigate complex menu systems or learn controls for different applications of the extended reality device 208.

Figure 3:
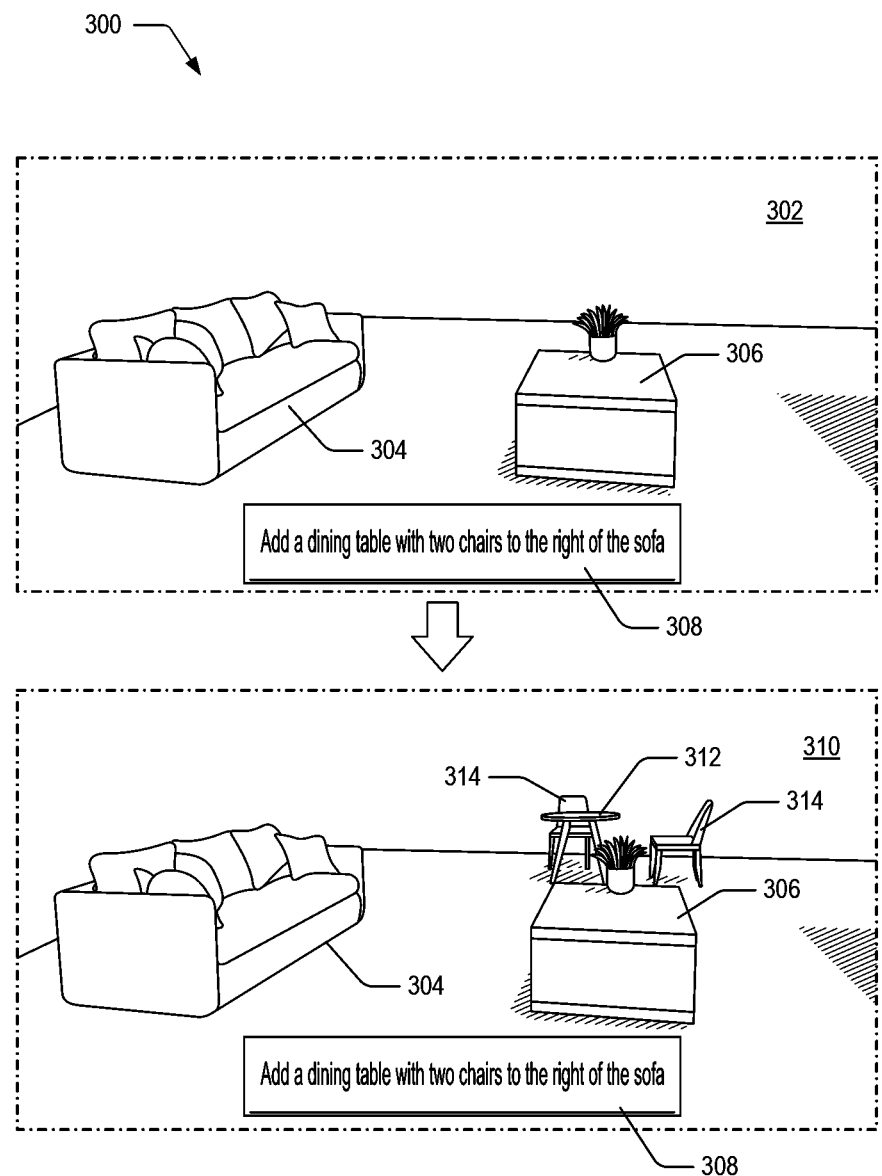
FIG. 3 illustrates an example extended reality environment in which an input is used to add an object using the techniques described herein.

FIG. 3 illustrates an example extended reality environment 300 in which an input is used to add an object using the techniques described herein. Reference will be made to components included in the example system 100 of FIG. 1 in the description of the extended reality environment 300. In some examples, the extended reality environment 300 is presented to a user by the computing device 112(A).

The extended reality environment 300 includes a first scene 302 illustrated at a first time, where the first scene 302 may correspond to a virtual room having various virtual objects included in the virtual room. For example, the first scene 302 includes an object 304 (e.g., a sofa) and an object 306 (e.g., a coffee table). The computing device 112(A) may receive a speech input 308 that includes "Add a dining table with two chairs to the right of the sofa," at the first time while the first scene 302 is being presented, and may provide the speech input 308 to the language processing component 118 as described herein.

The language processing component 118 may determine terms based on a semantic meaning of the speech input 308, along with a relationship between the terms in the speech input 308. In the illustrative example, the language processing component 118 identifies terms such as "dining table with two chairs," "right of," and "sofa." The language processing component 118 may provide these terms to the object manipulation component 120, which uses the terms to modify the extended reality environment 300 based on relationships between the terms. For example, the object manipulation component 120 may determine a position of the object 304 relative to the user in the extended reality environment 300 to select a relationship, in this case a direction, that the user means by "right of" The object manipulation component 120 may use this relationship, between the terms "right of" and "sofa" to determine where the user wants to add the "dining table with two chairs."

The extended reality environment 300 further includes a second scene 310 illustrated at a second time after the first time, where the second scene 310 may correspond to the virtual room having the object 304 and the object 306. In response to the speech input 308, the object manipulation component 120 has added an object 312 (e.g., a table) and objects 314 (e.g., chairs). The object manipulation component 120 has included the objects 312 and 314 at a location in the extended reality environment 300 based on the relationship identified in the speech input 308, in this case "to the right of the sofa."

Figure 4:
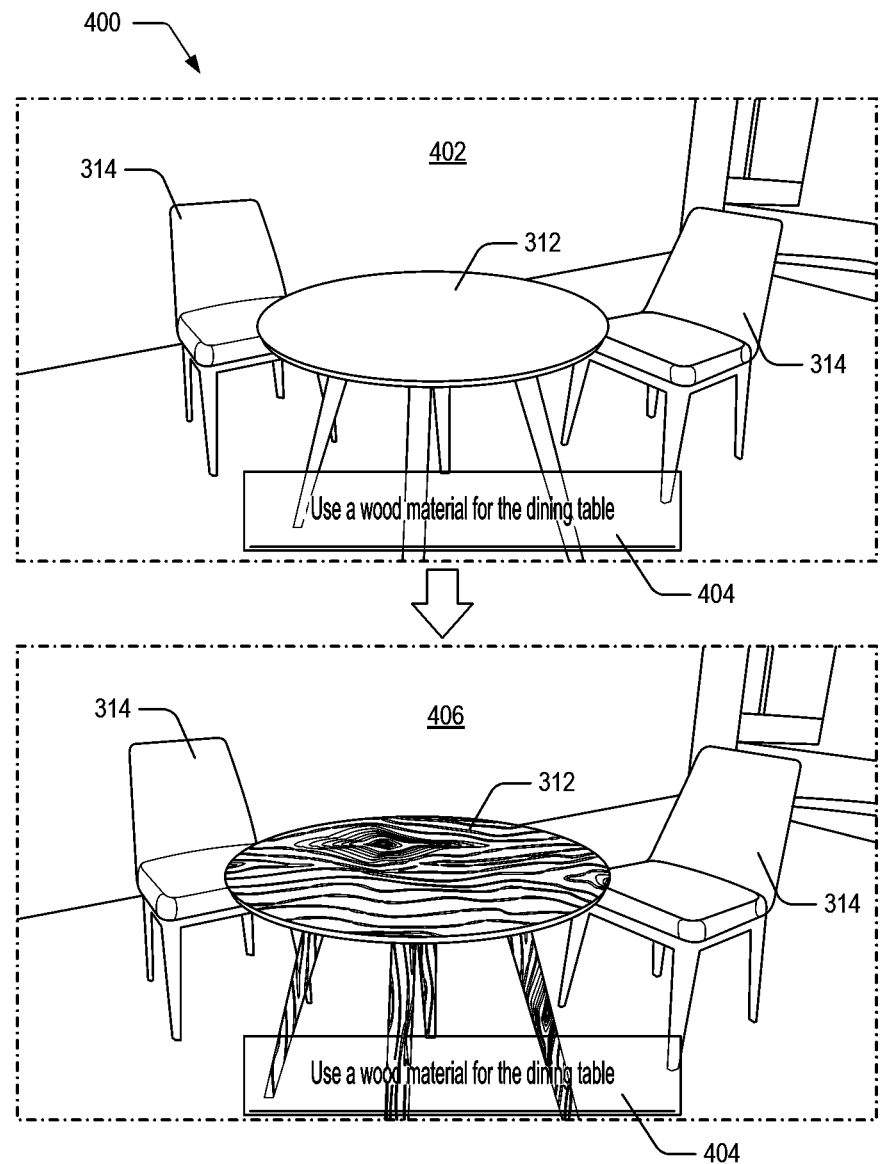
FIG. 4 illustrates an example extended reality environment in which an input is used to modify an object using the techniques described herein.

FIG. 4 illustrates an example extended reality environment 400 in which an input is used to modify an object using the techniques described herein. Reference will be made to components included in the example system 100 of FIG. 1 and the extended reality environment 300 in the description of the extended reality environment 400. In some examples, the extended reality environment 400 is presented to a user by the computing device 112(A).

The extended reality environment 400 includes a first scene 402 illustrated at a first time. The first scene 402 may correspond to the virtual room described in relation to the extended reality environment 300 of FIG. 3 following addition of the objects 312 and 314. In the illustrated example, the user of the computing device 112(A) has navigated through the extended reality environment 400 to a location closer to the objects 312 and 314. The computing device 112(A) may receive a speech input 404 that includes "Use a wood material for the dining table," at the first time while the first scene 402 is being presented, and may provide the speech input 404 to the language processing component 118 as described herein.

The language processing component 118 may determine terms based on a semantic meaning of the speech input 404, along with a relationship between the terms in the speech input 404. In the illustrative example, the language processing component 118 identifies terms such as "dining table," and "wood material." The language processing component 118 may provide these terms to the object manipulation component 120, which uses the terms to modify the extended reality environment 400 based on relationships between the terms. For example, the object manipulation component 120 may determine an attribute of the object 312 to select a relationship, in this case a material of the object, that the user wants to modify. The object manipulation component 120 may use this relationship, between the terms "dining table" and "wood material" to determine how the user wants to modify the object 312.

The extended reality environment 400 further includes a second scene 406 illustrated at a second time after the first time, where the second scene 406 may correspond to the virtual room having the object 312 and the objects 312. In response to the speech input 404, the object manipulation component 120 has changed an appearance of the material of the object 312 in the virtual environment to look like wood. The object manipulation component 120 has modified an attribute of the object 312 in the extended reality environment 400 based on the relationship identified in the speech input 404, in this case the relationship of the appearance of the material to that of the object 312.

Figure 5:
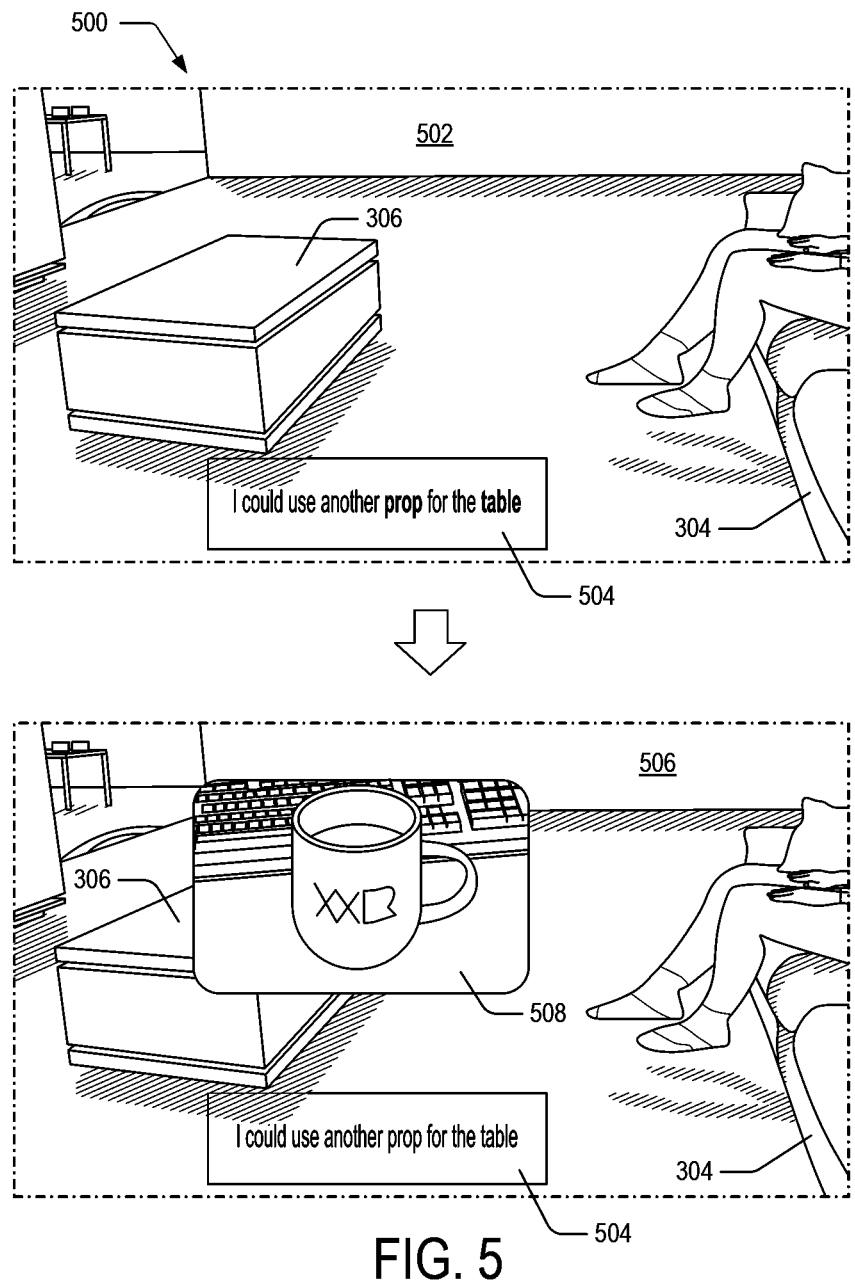
FIG. 5 illustrates an example extended reality environment in which an input is used to suggest an object to add to the extended reality environment using the techniques described herein.

FIG. 5 illustrates an example extended reality environment 500 in which an input is used to suggest an object to add to the extended reality environment using the techniques described herein. Reference will be made to components included in the example system 100 of FIG. 1 and the extended reality environment 300 in the description of the extended reality environment 500. In some examples, the extended reality environment 500 is presented to a user by the computing device 112(A).

The extended reality environment 500 includes a first scene 502 illustrated at a first time. The first scene 502 may correspond to the virtual room described in relation to the extended reality environment 300 of FIG. 3, including the object 304 and the object 306. In the illustrated example, the user of the computing device 112(A) has navigated through the extended reality environment 500 to view the objects 304 and 306 (e.g., from a different perspective than the extended reality environment 300). The computing device 112(A) may receive a speech input 504 that includes "I could use another prop for the table," at the first time while the first scene 502 is being presented, and may provide the speech input 504 to the language processing component 118 as described herein.

The language processing component 118 may determine terms based on a semantic meaning of the speech input 504, along with a relationship between the terms in the speech input 504. In the illustrated example, the language processing component 118 identifies terms such as "prop," and "table." The language processing component 118 may provide these terms to the object manipulation component 120, which uses the terms to modify the extended reality environment 500 based on relationships between the terms. In the illustrated example, the object manipulation component 120 may determine that the user is referencing the object 306 and is not referencing the object 312 from the word "table" based on a direction of the user's gaze at the time the speech input 504 was provided. For instance, because the object 312 is absent from the first scene 502, the object manipulation component 120 selects the object 306 as the "table" referenced in the speech input 504.

In examples, the object manipulation component 120 may determine an attribute of the object 306 to select a relationship, in this case a location on which the user wants to add another object (e.g., the "prop"). The object manipulation component 120 may use this relationship, between the terms "table" and "prop" to determine how the user wants to modify the extended reality environment 500 including the object 306. For example, the object manipulation component 120 may determine that objects are placed on top of tables, and thus may select a prop from an object library to place on the object 306. Alternatively or additionally, the object manipulation component 120 may enable the user to select an object to be used as the prop from a real-world environment surrounding the user for the prop.

The extended reality environment 500 further includes a second scene 506 illustrated at a second time after the first time, where the second scene 506 may correspond to the virtual room having the object 304 and the object 306. In response to the speech input 504, the object manipulation component 120 has provided a viewer 508 to a real-world environment surrounding the user, from which the user can select the prop to be added to the extended reality environment 500. The object manipulation component 120 has provided the viewer 508 to the real-world environment surrounding the user based on the speech input 504, in this case to allow the user to select a prop to be added to a location in relation to the object 306.

Figure 6:
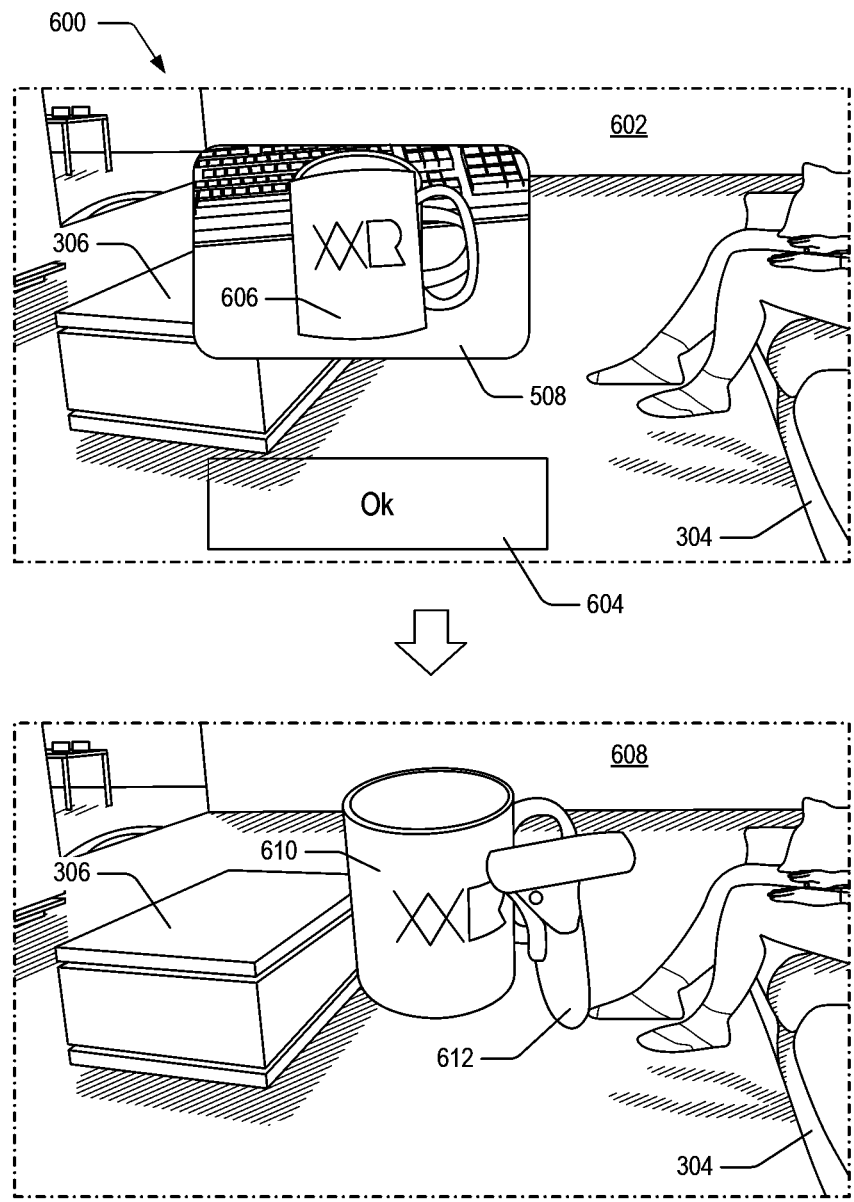
FIG. 6 illustrates an example extended reality environment in which an input is used to confirm an addition of an object using the techniques described herein.

FIG. 6 illustrates an example extended reality environment 600 in which an input is used to confirm an addition of an object using the techniques described herein. Reference will be made to components included in the example system 100 of FIG. 1, the extended reality environment 300, and the extended reality environment 500 in the description of the extended reality environment 600. In some examples, the extended reality environment 600 is presented to a user by the computing device 112(A).

The extended reality environment 600 includes a third scene 602 illustrated at a third time, which may be after the second time described in relation to the second scene 506 of FIG. 5. The third scene 602 may correspond to the virtual room described in relation to the extended reality environment 500 of FIG. 5, including the object 304, the object 306, and the viewer 508. In some examples, the language processing component 118 may receive a speech input 604 that includes "Ok," and determine that the speech input 604 indicates confirmation of selection of an object 606 to be used in the extended reality environment 600 as the prop indicated in the speech input 504 of FIG. 5. In some cases, the object manipulation component 120 selects the object 606 based further on a direction of a gaze of the user of the computing device 112(A) via the viewer 508.

The extended reality environment 600 further includes a fourth scene 608 illustrated at a fourth time after the third time, where the fourth scene 608 may correspond to the virtual room having the object 304, the object 306, and an object 610. In response to the speech input 604, the object manipulation component 120 may generate a virtual object that visually represents the object 606 from the real-world environment that was depicted in the viewer 508. The object manipulation component 120 may also provide a representation of a handheld controller 612 of the computing device 112(A), thus giving the user a visual indication of a location of the user's hand holding the object 610 throughout the extended reality environment 600. In some cases, the user can use the handheld controller 612 to place the object 610 on the object 306 in accordance with the speech input 504. Alternatively or additionally, the user can use the handheld controller 612 to place the object 610 at a different location in the extended reality environment 600. In this way, the user can coordinate speech inputs and use of a handheld controller (among other input types) of the computing device 112(A) to manipulate objects in the extended reality environment.

Mind Map Generation Using Speech Input

Figure 7:
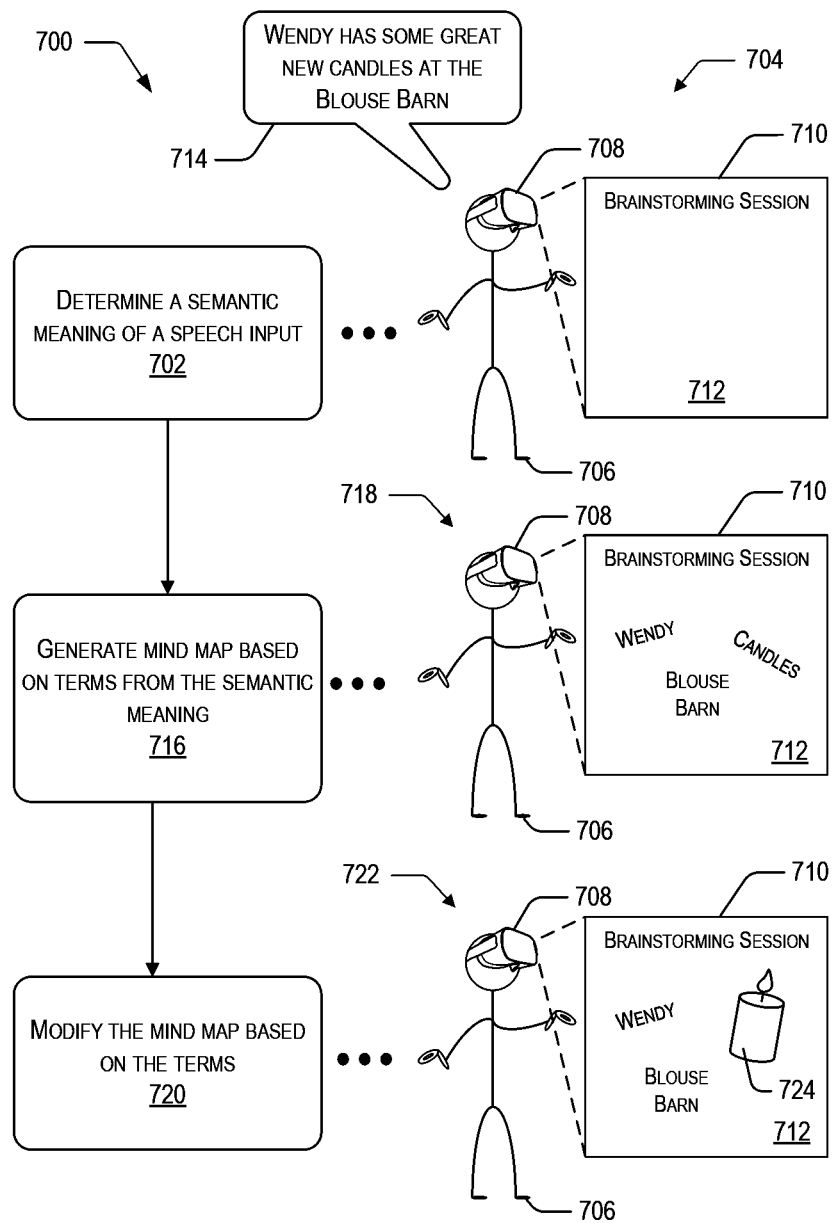
FIG. 7 is a pictorial flow diagram for generating a mind map in an extended reality environment using an input using the techniques described herein.

FIG. 7 is a pictorial flow diagram 700 for generating a mind map in an extended reality environment using an input using the techniques described herein. Reference will be made to components included in the example system 100 of FIG. 1 in the description of the pictorial flow diagram 700.

An operation 702 includes determining a semantic meaning of a speech input. For example, an environment 704 includes a user 706 wearing an extended reality device 708. The extended reality device 708 may correspond to any of the computing devices 112 of FIG. 1. The extended reality device 708 may be presenting an extended reality environment 710 to the user 706 via a display in a headset of the extended reality device 708. In the illustrated example, the extended reality environment 710 includes a virtual whiteboard 712, which may be functionality provided by an application 116 for brainstorming sessions to the computing device 112(A).

As shown in the environment 704, the user 706 has provided a speech input 714 that includes "Wendy has some great new candles at the Blouse Barn." In some examples, the speech input 714 is captured by a microphone of the extended reality device 708 and provided to the language processing component 118 of FIG. 1. The language processing component 118 determines a semantic meaning of the speech input 714. For example, the language processing component 118 may utilize a deep neural network to determine parts of speech of the speech input 714, such as nouns, verbs, adjectives, and so forth, along with definitions of the words included in the speech input 714, and/or how the order of the words in the speech input 714 affect the semantic meaning.

In the illustrated example, the language processing component 118 may determine that the speech input 714 includes a concept and sub-concepts to be included in a mind map, where this determination may be based in part on utilization of the application 116 by the computing device 112(A) for brainstorming sessions. For example, the language processing component 118 may determine, based on the semantic meaning, that "Blouse Barn" is a central concept of the brainstorming session, and that "Wendy" and "candles" are sub-concepts related to the "Blouse Barn" concept.

An operation 716 includes generating a mind map based on terms from the semantic meaning. As discussed above, the language processing component 118 may provide terms from the speech input 714 to the mind map component 122 to generate a mind map in the extended reality environment 210. For instance, an environment 718 includes the user 706 wearing the extended reality device 708, which is presenting the extended reality environment 710 including the virtual whiteboard 712 to the user 706. The environment 718 provides an example of how the terms provided by the language processing component 118 to the mind map component 122 may be used to generate a mind map on the virtual whiteboard 712 based on the speech input 714.

For instance, the mind map illustrated on the virtual whiteboard 712 in the environment 718 includes the terms designated by the language processing component 118 as sub-concepts, "Wendy" and "candles," visually separated from the term designated by the language processing component 118 as a concept, "Blouse Barn." The term "Blouse Barn," being the central concept of the mind map, is located at a central location relative to the sub-concepts "Wendy" and "candles." In this way, the mind map component 122 generates the mind map illustrated on the virtual whiteboard 712 in the environment 718 such that the 3D representation of the mind map visually distinguishes the sub-concepts from one another, and visually identifies the central concept of the mind map.

An operation 720 includes modifying the mind map based on the terms. In some examples, the mind map component 122 may replace a term in a mind map with a corresponding object from a virtual object library. For example, an environment 722 includes the user 706 wearing the extended reality device 708, which is presenting the extended reality environment 710 including the virtual whiteboard 712 to the user 706. The environment 722 provides an example of how the mind map component 122 may modify a mind map to include virtual objects in place of text.

In some instances, the mind map component 122 may, as a mind map is being generated, replace one or more of the text representing concepts or sub-concepts in the mind map with a virtual object. For example, objects included in the object library may include one or more tags of terms that represent an object. The mind map component 122 may automatically search terms to be included in a mind map in tags of the object library, and in response to determining a match between a term and a tag, may replace the term in the mind map with the virtual object having the tag. Doing so may provide the user 706 (and/or other users who reference the mind map) with a more easily distinguishable, navigable, and comprehensible visualization of what took place during the brainstorming session. In the illustrated example, the mind map component 122 has replaced the term "candles" at the location of the term in the mind map with an object 724 corresponding to a candle. Alternatively or additionally, the mind map component 122 may search terms to be included in a mind map in tags of audio clips, and in response to determining a match between a term and a tag, may replace the term in the mind map with the audio clip having the tag.

Figure 8:
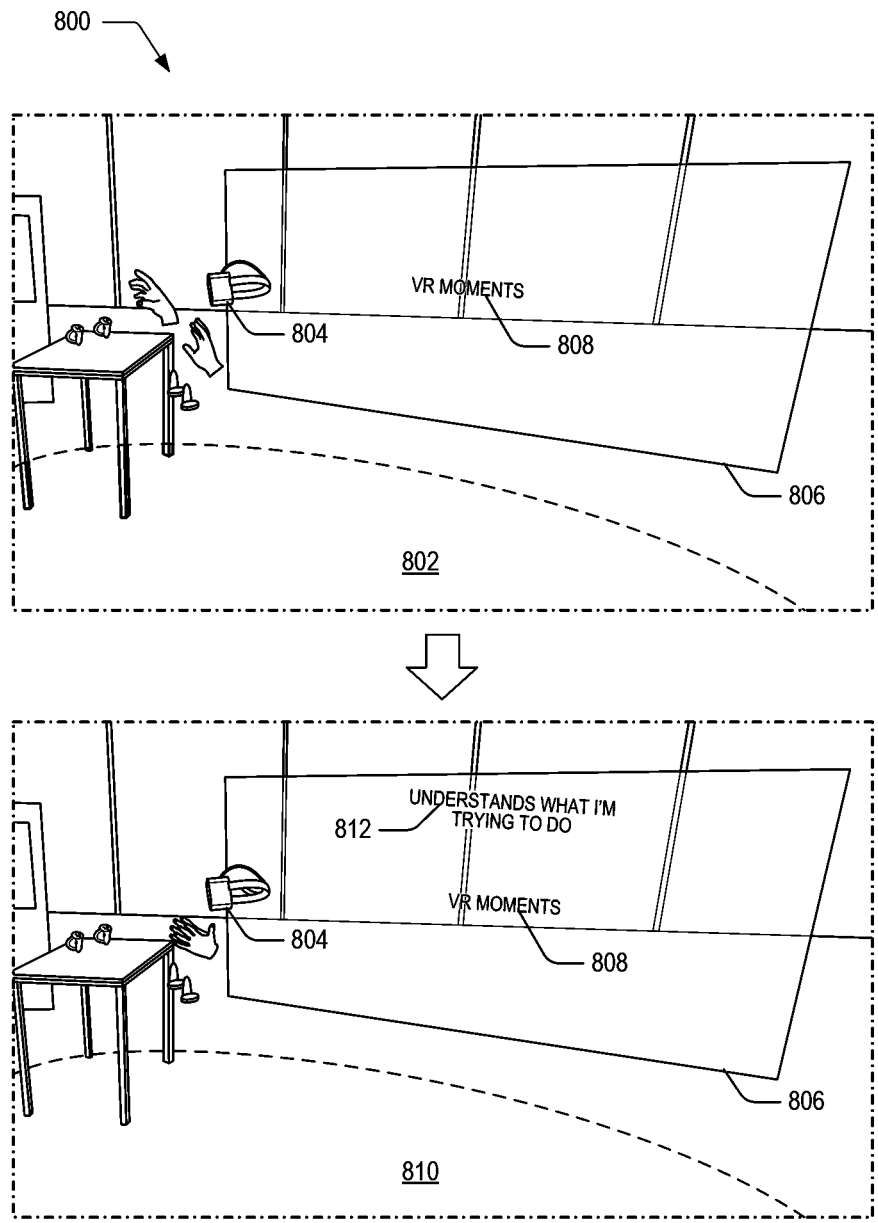
FIG. 8 illustrates an example extended reality environment in which an input is used to create a mind map using the techniques described herein.

FIG. 8 illustrates an example extended reality environment 800 in which an input is used to create a mind map using the techniques described herein. Reference will be made to components included in the example system 100 of FIG. 1 in the description of the extended reality environment 800. In some examples, the extended reality environment 800 is presented to a user by the computing device 112(A).

The extended reality environment 800 includes a first scene 802 illustrated at a first time, where the first scene 802 may correspond to a brainstorming session presented by the application 116 of the computing device 112(A). The first scene 802 includes a representation 804 of a computing device (e.g., the computing device 112(N)) being used by an additional user in the extended reality environment 800 who is participating in the brainstorming session. Additionally, the first scene 802 includes a virtual whiteboard 806 for the brainstorming session. In the illustrated example, the virtual whiteboard 806 includes a concept 808, in this case "VR Moments." In some cases, the mind map component 122 may cause the concept 808 to be displayed on the virtual whiteboard 806 in response to a speech input, such as described in relation to FIG. 7. The speech input may be received from any of the computing devices 112 participating in the brainstorming session.

Additionally, the extended reality environment 800 includes a second scene 810 illustrated at a second time after the first time. The second scene 810 also includes the representation 804 and the virtual whiteboard 806. In the illustrated example of the second scene 810, the virtual whiteboard 806 includes the concept 808, along with a sub-concept 812 corresponding to "Understands what I'm trying to do." In some examples, the mind map component 122 may cause the sub-concept 812 to be displayed on the virtual whiteboard 806 in response to a speech input, such as described in relation to FIG. 7. The speech input related to the sub-concept may be received from a same one of the computing devices 112 that provided the speech input related to the concept 808, or a different one of the computing devices 112 that provided the speech input related to the concept 808.

In examples, the mind map component 122 generates a 3D representation of the virtual whiteboard 806 that indicates the relationship between the concept 808 and the sub-concept 812. For instance, in the illustrated example, the concept 808 is located generally in a center of the virtual whiteboard 806, and the sub-concept 812 is spaced apart from the concept 808 near an exterior of the virtual whiteboard 806. Other examples of visual representations of the relationship between the concept 808 and the sub-concept 812 in three dimensions are also considered, such as lines, arrows, colors, highlighting, and the like.

Figure 9:
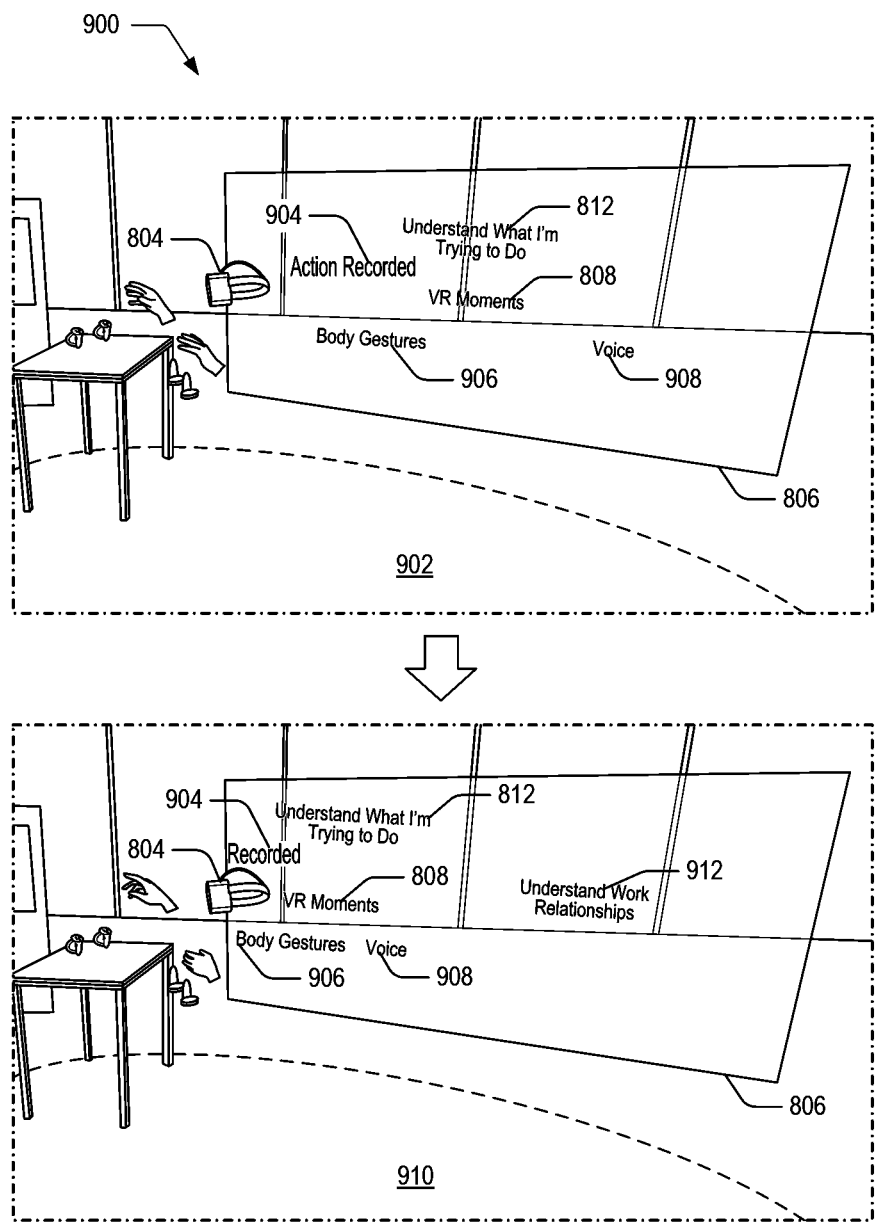
FIG. 9 illustrates an example extended reality environment in which an input is used to add concepts to a mind map using the techniques described herein.

FIG. 9 illustrates an example extended reality environment 900 in which an input is used to add concepts to a mind map using the techniques described herein. Reference will be made to components included in the example system 100 of FIG. 1 and the extended reality environment 800 in the description of the extended reality environment 900. In some examples, the extended reality environment 900 is presented to a user by the computing device 112(A).

The extended reality environment 900 includes a third scene 902 illustrated at a third time after the second time of the second scene 810 and associated with the brainstorming session presented by the application 116 of the computing device 112(A). The third scene 902 also includes the representation 804 and the virtual whiteboard 806. In the illustrated example of the third scene 902, the virtual whiteboard 806 includes the concept 808, the sub-concept 812, a sub-concept 904 corresponding to "Actions recorded," a sub-concept 906 corresponding to "Body gestures," and a sub-concept 908 corresponding to "Voice." In some examples, the mind map component 122 may cause the sub-concept 904, the sub-concept 906, and the sub-concept 908 to be displayed on the virtual whiteboard 806 in response to corresponding speech inputs, such as described in relation to FIG. 7. Any of the speech inputs related to the sub-concepts 904, 906, and 908 may be received from a same one of the computing devices 112 that provided the speech inputs related to the concept 808 and the sub-concept 812, or a different one of the computing devices 112 that provided the speech inputs related to the concept 808 and the sub-concept 812.

In examples, the mind map component 122 modifies what is displayed on the virtual whiteboard 806 to indicate the relationships between the concept 808 and the sub-concept 812, the sub-concept 904, the sub-concept 906, and the sub-concept 908. For instance, in the illustrated example, the sub-concept 904, the sub-concept 906, and the sub-concept 908 are spaced apart from the concept 808 near an exterior of the virtual whiteboard 806. Additionally, the sub-concept 904, the sub-concept 906, and the sub-concept 908 are spaced apart from one another to distinguish the different sub-concepts from each other, and to distinguish these sub-concepts from the sub-concept 812.

Additionally, the extended reality environment 900 includes a fourth scene 910 illustrated at a fourth time after the third time of the third scene 902 and associated with the brainstorming session presented by the application 116 of the computing device 112(A). The fourth scene 910 also includes the representation 804 and the virtual whiteboard 806. In the illustrated example of the fourth scene 910, the virtual whiteboard 806 includes the concept 808, the sub-concept 812, a portion of the sub-concept 904, the sub-concept 906, and the sub-concept 908.

In some examples, the mind map component 122 may cause a new concept 912 corresponding to "Understand work relationships" to be displayed on the virtual whiteboard 806 in response to a speech input, such as described in relation to FIG. 7. The speech input related to the new concept 912 may be received from a same one or a different one of the computing devices 112 that provided the speech inputs related to the concept 808 or any of the sub-concepts associated therewith. As shown, the concept 808, the sub-concept 812, the sub-concept 904, the sub-concept 906, and the sub-concept 908 have moved relative to the virtual whiteboard 806 to create space for the new concept 912. For example, the language processing component 118 may determine that the discussion of the brainstorming session is focusing on a different concept than the concept 808, and automatically rearrange the display on the virtual whiteboard 806 to represent the relationship of the new concept 912 relative to the concept 808 and associated sub-concepts.

Figure 10:
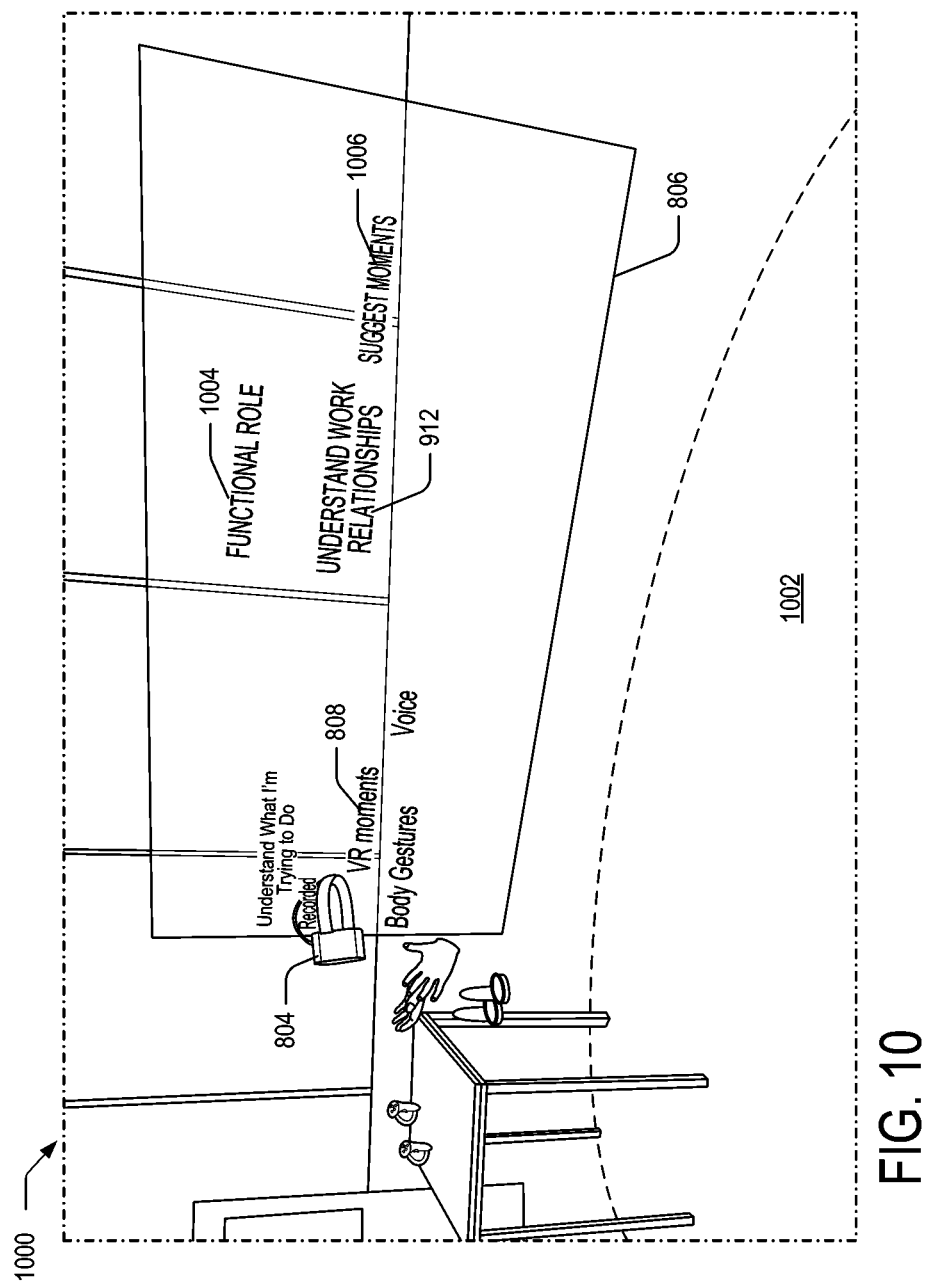
FIG. 10 illustrates an example extended reality environment in which an input is used to add additional concepts to a mind map using the techniques described herein.

FIG. 10 illustrates an example extended reality environment 1000 in which an input is used to add additional concepts to a mind map using the techniques described herein. Reference will be made to components included in the example system 100 of FIG. 1 and the extended reality environment 900 in the description of the extended reality environment 1000. In some examples, the extended reality environment 1000 is presented to a user by the computing device 112(A).

The extended reality environment 1000 includes a fifth scene 1002 illustrated at a fifth time after the fourth time of the fourth scene 910 and associated with the brainstorming session presented by the application 116 of the computing device 112(A). The fifth scene 1002 also includes the representation 804 and the virtual whiteboard 806. In the illustrated example of the fifth scene 1002, the virtual whiteboard 806 includes the concept 808 with at least portions of the associated sub-concepts described above, along with the new concept 912.

In some examples, the mind map component 122 may cause a sub-concept 1004 corresponding to "Functional role," and a sub-concept 1006 corresponding to "Suggest moments," to be displayed on the virtual whiteboard 806 in response to respective speech inputs, such as described in relation to FIG. 7. The speech inputs related to the sub-concepts 1004 and 1006 may be received from a same one or a different one of the computing devices 112 that provided the speech inputs related to the new concept 912, or the concept 808 or any of the sub-concepts associated therewith. The mind map component 122 modifies what is displayed on the virtual whiteboard 806 to indicate the relationships between the new concept 912 and the sub-concept 1004 and the sub-concept 1006. For instance, in the illustrated example, the sub-concept 1004 and the sub-concept 1006 are spaced apart from the new concept 912 near an exterior of the virtual whiteboard 806. Additionally, the sub-concept 1004 and the sub-concept 1006 are spaced apart from one another to distinguish the different sub-concepts from each other. Further, the sub-concept 1004 and the sub-concept 1006 are spaced apart from the concept 808 and the sub-concepts associated with the concept 808, to distinguish these sub-concepts from each other while associating the sub-concepts with the respective concepts according to the discussion during the brainstorming session.

Recording and Timeline Generation and Navigation Using Speech Input

Figure 11:
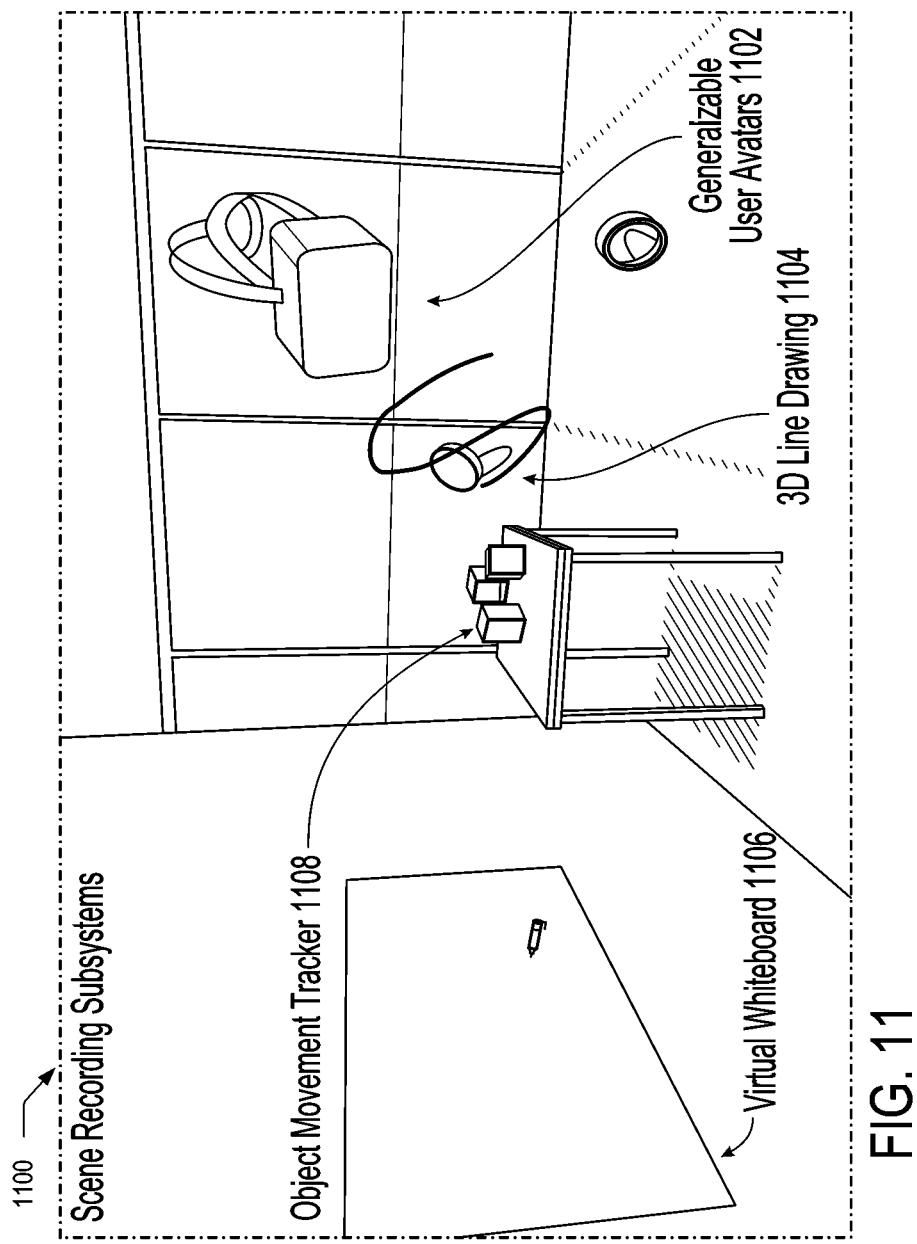
FIG. 11 illustrates an example extended reality environment including different scene recording subsystems usable to implement example techniques for visually representing relationships in an environment based on an input described herein.

FIG. 11 illustrates an example extended reality environment 1100 including different scene recording subsystems usable to implement example techniques for visually representing relationships in an environment based on an input described herein. Reference will be made to components included in the example system 100 of FIG. 1 in the description of the extended reality environment 1100. In some examples, the extended reality environment 1100 is presented to a user by the computing device 112(A).

The extended reality environment 1100 may include a generalizable user avatar 1102, which may correspond to a representation of the computing device 112(A) of FIG. 1. In the illustrated example, the generalizable user avatar 1102 includes a representation of a headset and representations of two handheld controllers, which may correspond to components of the computing device 112(A). The 3D relationship component 108 may receive movements and gestures performed by the computing device 112(A), and represent the movements and gestures in the extended reality environment 1100 (or any of the extended reality environments described herein). In some examples, the timeline component 124 includes the movements and gestures represented in the extended reality environment 1100 in a recording of an extended reality session.

Additionally, in some instances, the extended reality environment 1100 includes a 3D line drawing 1104, which may be created using a handheld controller of the computing device 112(A). For instance, a user may create the 3D line drawing 1104 by holding a button on the handheld controller and moving the handheld controller throughout the real-world environment. The timeline component 124 may include the 3D line drawing 1104 represented in the extended reality environment 1100 in a recording of an extended reality session.

In examples, the extended reality environment 1100 includes a virtual whiteboard 1106. For instance, the virtual whiteboard 1106 may be displayed by an application 116 as part of a brainstorming session to facilitate creation of a mind map. The mind map component 122 may receive terms from speech inputs and generate a mind map displayed on the virtual whiteboard 1106 as described herein. The timeline component 124 may include a mind map, and/or other content added to the virtual whiteboard 1106, in a recording of an extended reality session. Additionally, in some cases, the timeline component 124 may tag portions of the recording with terms included in the mind map as displayed on the virtual whiteboard 1106, such as when the terms were spoken in the extended reality session.

The extended reality environment 1100 may also include an object movement tracker 1108. In some examples, the object movement tracker 1108 records when and how objects are moved in the extended reality environment 1100. For instance, a user may select an object using a handheld controller of the computing device 112(A), and move the object throughout the extended reality environment 1100. Alternatively or additionally, a user may use a speech input to move and/or manipulate an object in the extended reality environment using the language processing component 118 and the object manipulation component 120 as described above. The timeline component 124 may include movements of objects represented in the extended reality environment 1100 and recorded by the object movement tracker 1108 in a recording of an extended reality session.

Figure 12:
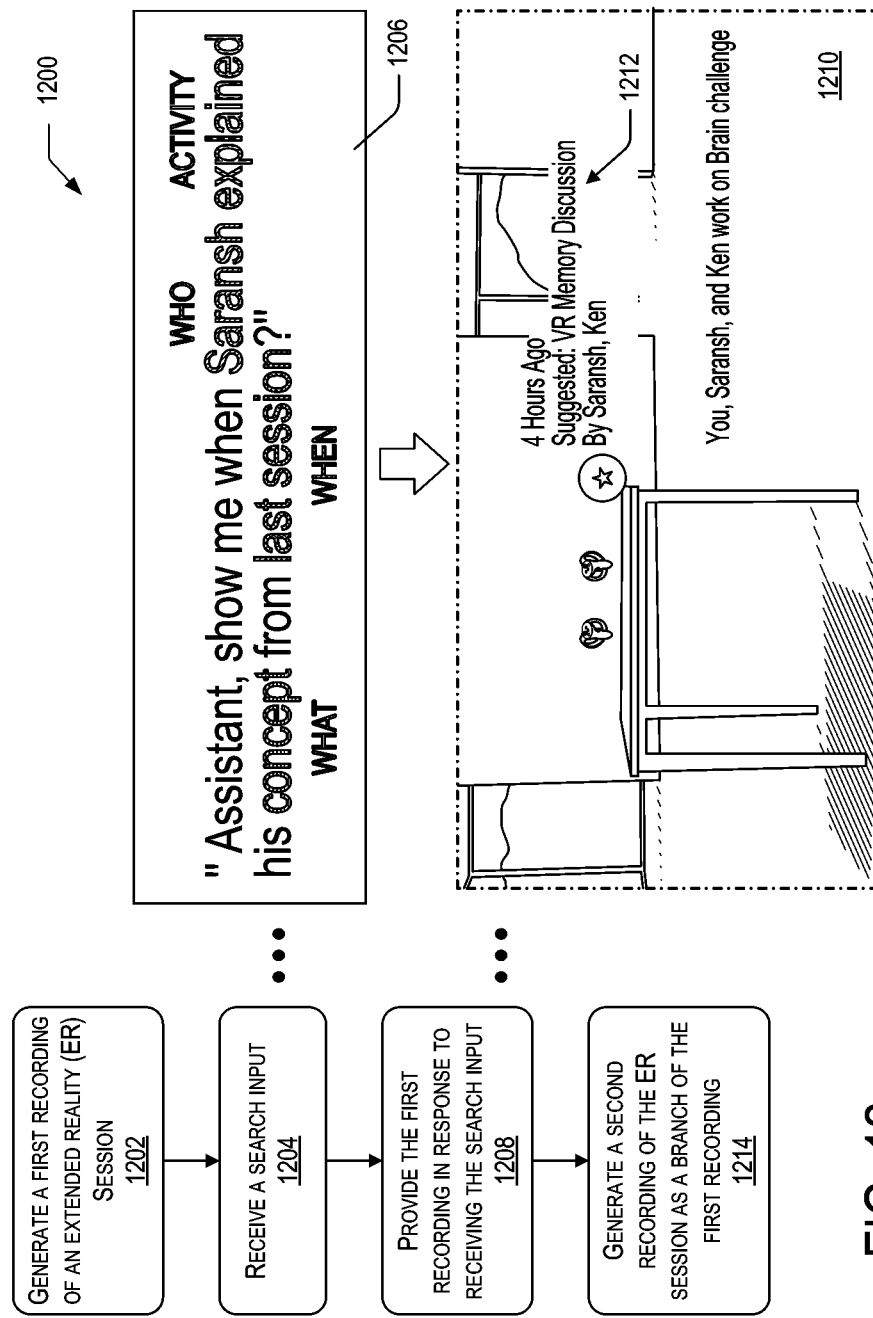
FIG. 12 is a pictorial flow diagram for using an input to search for a moment in an extended reality system using the techniques described herein.

FIG. 12 is a pictorial flow diagram 1200 for using an input to provide a search in an extended reality system using the techniques described herein. Reference will be made to components included in the example system 100 of FIG. 1 and the example extended reality environment 1100 in the description of the pictorial flow diagram 1200.

An operation 1202 includes generating a first recording of an extended reality session. In examples, various ones of the scene recording subsystems described in reference to the extended reality environment 1100 may be used to record different aspects of an extended reality session as the extended reality session progresses. For instance, the object movement tracker 1108 may record movement of objects in an extended reality environment using handheld controllers, and the virtual whiteboard 1106 may record drawings made using the handheld controllers, to name a few examples. In some examples, the timeline component 124 may record speech inputs during the extended reality session, and compile the speech inputs and recordings supplied by the scene recording subsystems into a recording of the extended reality session.

Each of the recordings included in the timeline may have one or more tags associated with the recording. For instance, the timeline component 124 may include tags of terms identified in the speech inputs at times during an extended reality session when the terms where spoken. Alternatively or additionally, the timeline component 124 may include tags of gestures, tags of 3D line drawings, tags of drawings made on the virtual whiteboard 1106, tags of movement (or other modification) of objects at times during an extended reality session when these inputs took place, tags of users included in a social graph of another user, and so forth.

An operation 1204 includes receiving a search input. For example, the computing device 112(A) may provide a speech input to the language processing component 118, which may identify the speech input as a search input. In some cases however, the search input may be received as a text input from a keyboard or other text input device. An example of a search input 1206 is illustrated, that includes "Assistant, show me when Saransh explained his concept from last session." As discussed above, the language processing component 118 may use a deep neural network to identify terms in the search input 1206. In the illustrated example, the language processing component 118 has identified who the user is searching for, in this case "Saransh." The language processing component 118 has also identified an activity that the user is searching for, in this case "explained." Additionally, the language processing component 118 has identified what the user is searching for, in this case "concept." Further, the language processing component 118 has identified a specific extended reality session that the user wants to limit the search to, in this case the "last session." In at least some examples, the language processing component 118 may interpret references included in the search input 1206 based on objects, other users, and the like based at least in part on how the user has used such terms in the past and/or how the term relates to the user that provided the search input 1206. For instance, the language processing component 118 may leverage a social graph of the user that provided the search input 1206 to determine which other user(s) that the user interacts with most frequently, and select a search result based at least in part on the social graph. Similarly, the language processing component 118 may determine objects or actions that the user that provided the search input 1206 that the user interacts with most frequently, and select a search result based at least in part on such objects or actions.

The language processing component 118 may provide the terms identified in the search input 1206 to the timeline component 124, which may then identify tagged portions of one or more extended reality sessions to select one or more search results. For example, the timeline component 124 may limit the search results to the previous extended reality session that a user participated in, based on the "when" portion of the search input 1206. Additionally, the timeline component 124 may limit the search results to speech inputs provided by Saransh, based on the "who" portion of the search input 1206. The timeline component 124 may use gestures identified by the generalizable user avatars 1102 to determine when Saransh was explaining for the "activity" portion of the search input 1206. For example, the timeline component 124 may map an activity label of "explain-" to particular hand gestures, and search hand gestures recorded by the generalizable user avatars 1102 during an extended reality session. Further, the timeline component 124 may limit the search results to portions of the extended reality session when Saransh spoke for greater than a threshold amount of time (e.g., 30 seconds, 1 minute, 5 minutes, etc.) to determine when Saransh was explaining his concept (e.g., rather than asking a question of another user explaining the other user's concept during the extended reality session, for instance).

An operation 1208 includes providing the first recording in response to receiving the search input. In some cases, the timeline component 124 may provide a portion of the first recording in response to the search input, such as an amount of time (e.g., 1 minute, 2 minutes, 5 minutes, etc.) before, surrounding, or after a search result determined in the operation 1204. In some examples, the timeline component 124 may cause the first recording to be presented to focus on one or more components in the recording that were mentioned in the search input 1206. For instance, because the search input 1206 includes Saransh's name, the timeline component 124 may cause the portion of the recording being presented via the computing device 112(A) to be facing a representation of Saransh in the extended reality session, and provide a spotlight on the representation of Saransh in the extended reality session.

For instance, a scene 1210 of an extended reality environment is shown, which may be presented by the computing device 112(A) in response to the search input 1206. The scene 1210 includes information 1212 which may be compiled by the timeline component 124 in response to the search input 1206, giving the user an indication of the search result corresponding to a portion of the first recording selected by the timeline component 124 for presentation. In some cases, the user may confirm presentation of the portion of the first recording, such as via a speech input (e.g., "Play the suggested recording"), a selection of a button via a handheld controller, or the like. In response to receiving confirmation to present the portion of the first recording, the computing device 112(A) may present the portion of the recording, such as with the focus provided by the timeline component 124 (e.g., spotlight, highlight, etc.). Alternatively or additionally, the user may want to view additional search results, and provide a speech input (e.g., "Show me more results"), a selection of a button via a handheld controller, or the like, to view additional results or conduct a different search.

An operation 1214 includes generating a second recording of the extended reality session as a branch of the first recording. For instance, the user may want to add more information (e.g., speech input, documents, notes, etc.) to supplement the information presented in the extended reality session, without altering the content of the extended reality session itself. Therefore, the timeline component 124 may generate a second recording of an extended reality session that is associated with the portion of the first extended reality session selected using the search input 1206. Similar to the first recording, the second recording may include recordings captured by the various scene recording systems described in relation to FIG. 11, and/or tagged speech inputs and resulting relationships captured using the object manipulation component 120 or the mind map component 122 as described above. Accordingly, rather than the first recording being a "linear" timeline, the addition of the second recording at a particular location in the first recording generates a branched timeline having both the first recording and the second recording included in the branched timeline.

Figure 13:
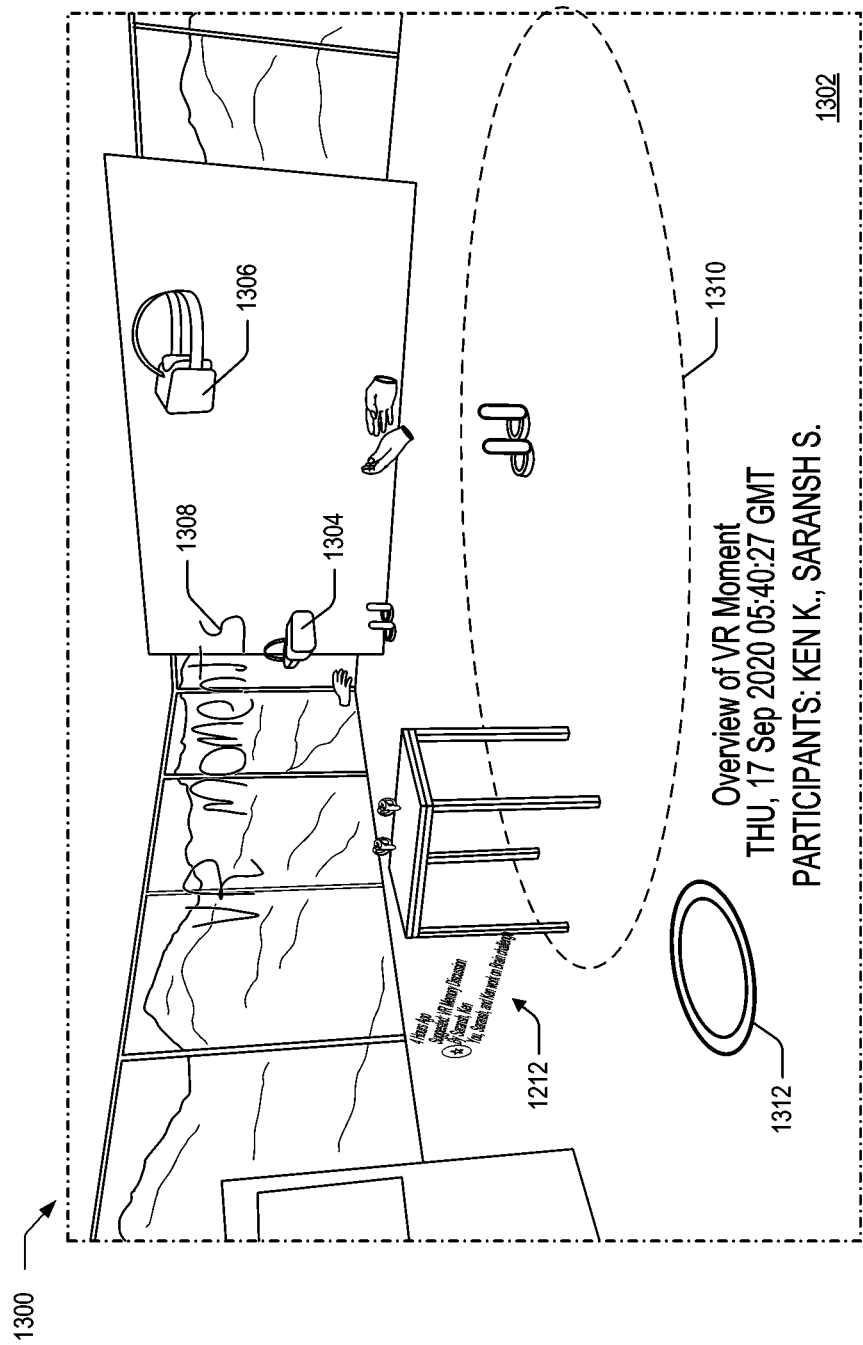
FIG. 13 illustrates an example extended reality environment which may be presented as a result of a search input using the techniques described herein.

FIG. 13 illustrates an example extended reality environment 1300 including a scene 1302 which may be presented as a result of a search input using the techniques described herein. Reference will be made to components included in the example system 100 of FIG. 1, the extended reality environment 1100, and the pictorial flow diagram 1200 in the description of the extended reality environment 1300. In some examples, the extended reality environment 1300 is presented to a user by the computing device 112(A).

In some examples, the scene 1302 may be presented in response to confirmation to view of a portion of a recording of an extended reality session, where the portion of the recording is provided as a result of a search input, such as the search input 1206. In the illustrated example, the scene 1302 includes an extended reality device 1304 and an extended reality device 1306, which may be extended reality devices (e.g., any of the computing devices 112) that participated in the extended reality session from which the recording was generated. Additionally, the scene 1302 includes a 3D line drawing 1308 and the information 1212 related to the portion of the recording related to the search input 1206.

The timeline component 124 may present the scene 1302 to focus on or emphasize components of the scene based on the search input 1206. For instance, an outline 1310 may correspond to an area of the scene 1302 being presented in a spotlight, such that objects inside of the outline 1310 are illuminated and objects outside of the outline 1310 are darkened. In this way, the timeline component 124 can focus a user's attention on portions of the recording of the extended reality environment that are relevant to the search input 1206. Accordingly, in the illustrated example, the extended reality device 1304 and the 3D line drawing 1308 are illuminated by the spotlight, while the extended reality device 1306 may be darkened. The timeline component 124 may use this effect can indicate that the user of the extended reality device 1304 was speaking during the portion of the recording being presented in response to the search input 1206, and to emphasize what the user was speaking about (e.g., the 3D line drawing 1308).

Other techniques to emphasize various portions of the scene 1302 may be used as well. For example, an icon 1312 is shown in the scene 1302, which may be included by the timeline component 124 in the scene 1302 to emphasize the information 1212. In the illustrated example, the information 1212 is located in a darkened portion of the scene 1302 (e.g., outside of the outline 1310). The timeline component 124 may locate the information 1212 summarizing the portion of the recording in the darkened portion of the scene 1302 so that the information 1212 does not distract from viewing the desired portion of the recording inside of the outline 1310.

Therefore, the timeline component 124 may provide the icon 1312 to indicate the location of the information 1212 in the scene 1302 if the user viewing the recording wishes to return to view the information 1212. Additional techniques to emphasize various portions of the scene 1302 are also considered, such as displaying a caption of what is spoken by a user of the extended reality device 1306, modifying a volume of what is spoken by a user of the extended reality device 1306, highlighting or spotlighting a portion of a mind map and/or an object in the extended reality environment based on the search input 1206, and so forth.

Figure 14:
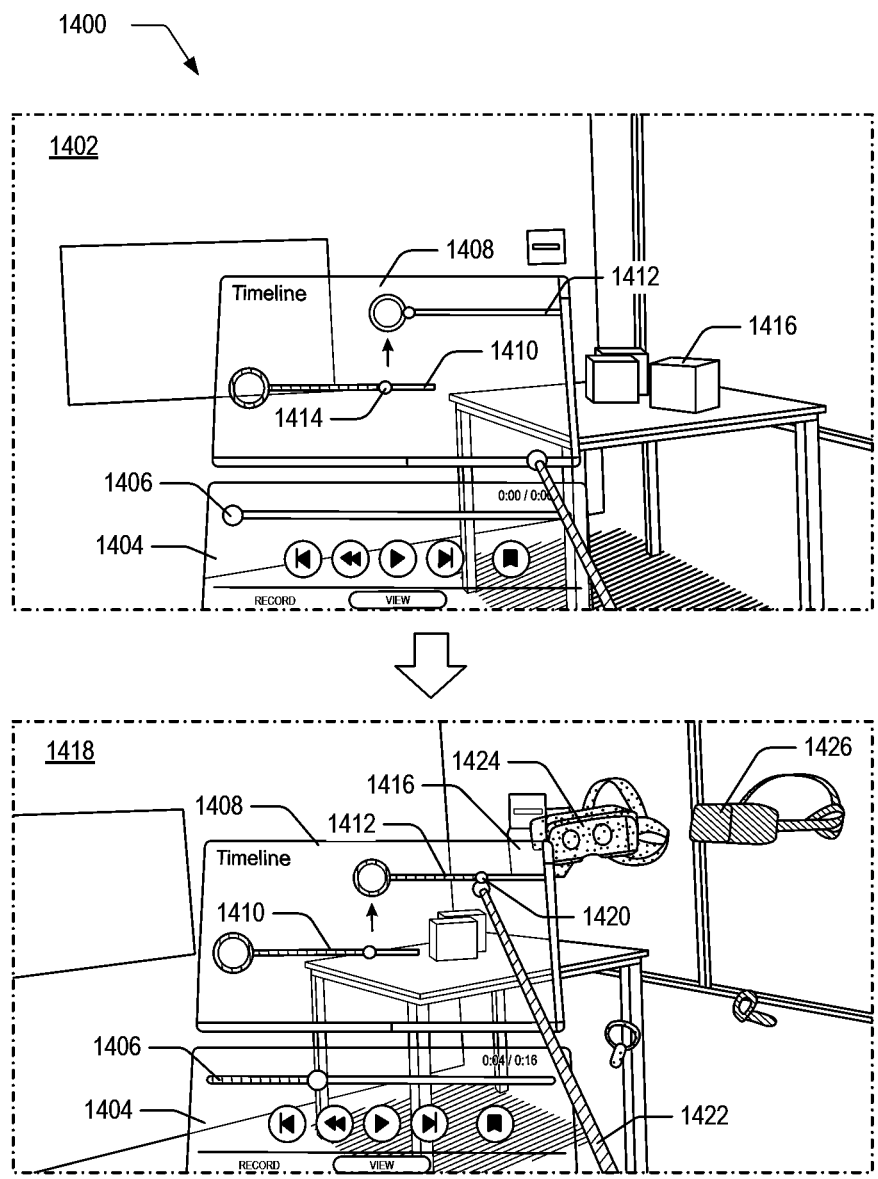
FIG. 14 illustrates an example extended reality environment in which a branched timeline is created using the techniques described herein.

FIG. 14 illustrates an example extended reality environment 1400 in which a branched timeline is created using the techniques described herein. Reference will be made to components included in the example system 100 of FIG. 1 and the extended reality environment 1100, and the pictorial flow diagram 1200 in the description of the extended reality environment 1400. In some examples, the extended reality environment 1400 is presented to a user by the computing device 112(A).

The extended reality environment 1400 includes a first scene 1402 which may be presented by the computing device 112 (A) at a first time. The first scene 1402 includes a navigation interface 1404, which may be used by a user of the computing device 112(A) to navigate through a recording of an extended reality session using a scrub bar 1406, and/or use controls to jump to a different recording, rewind or fast-forward the currently displayed recording, play or pause the currently displayed recording, and so forth. In examples, the scrub bar 1406 may indicate a time of a recording of an extended reality session that is currently being viewed in the first scene 1402.

The first scene 1402 may also include a timeline interface 1408 which includes a representation of a branched timeline associated with two recordings of extended reality sessions. For example, the timeline interface 1408 includes a first timeline 1410 corresponding to a recording of a first extended reality session, and a second timeline 1412 corresponding to a recording of a second reality session. An icon 1414 on the first timeline 1410 indicates a time that the second timeline 1412 is associated with the first timeline 1410.

For instance, as discussed in relation to the pictorial flow diagram 1200 of FIG. 12, a user may want to add more information at a specific location of a previously recorded extended reality session, without altering or deleting the previous recording. In the illustrated example, a user of the computing device 112(A) may have wanted to move or modify an object 1416 in the environment, such as one of the blocks on the table, at the time indicated by the icon 1414. The timeline component 124 may generate a branched timeline to identify the relationship between the first timeline 1410 and the second timeline 1412 at the time indicated by the icon 1414, while maintaining the content of the recording in the first timeline 1410.

The extended reality environment 1400 also includes a second scene 1418 which may be presented by the computing device 112 (A) at a second time after the first time. For example, the second scene 1418 may be presented in response to the recording associated with the second timeline 1412 playing for a time as represented by an icon 1420 on the second timeline 1412. Alternatively or additionally, the user of the computing device 112(A) my select the time represented by the icon 1420 using a virtual controller 1422 controlled by a handheld controller of the computing device 112(A). The second scene 1418 also includes the navigation interface 1404 and the scrub bar 1406, which may be used to control navigation through the second timeline 1412.

As noted above, the recording associated with the second timeline 1412 may include different content than the recording associated with the first timeline 1410. For instance, the second scene 1418 includes a representation 1424 of a first extended reality device, and a representation 1426 of a second reality device that were not present in the first scene 1402. Users of the first and second extended reality devices may manipulate the extended reality environment 1400 without altering the recording associated with the first timeline 1410. In the illustrated example, a user of the extended reality device associated with the representation 1424 has moved the object 1416 in the extended reality environment 1400. The recording associated with the second timeline 1412 will include this modification, but the recording associated with the first timeline 1410 may not include this modification. Any of the functionality described herein may be included in a branched timeline, such as functionality described in relation to the object manipulation component 120 and/or functionality described in relation to the mind map component 122.

Figure 15:
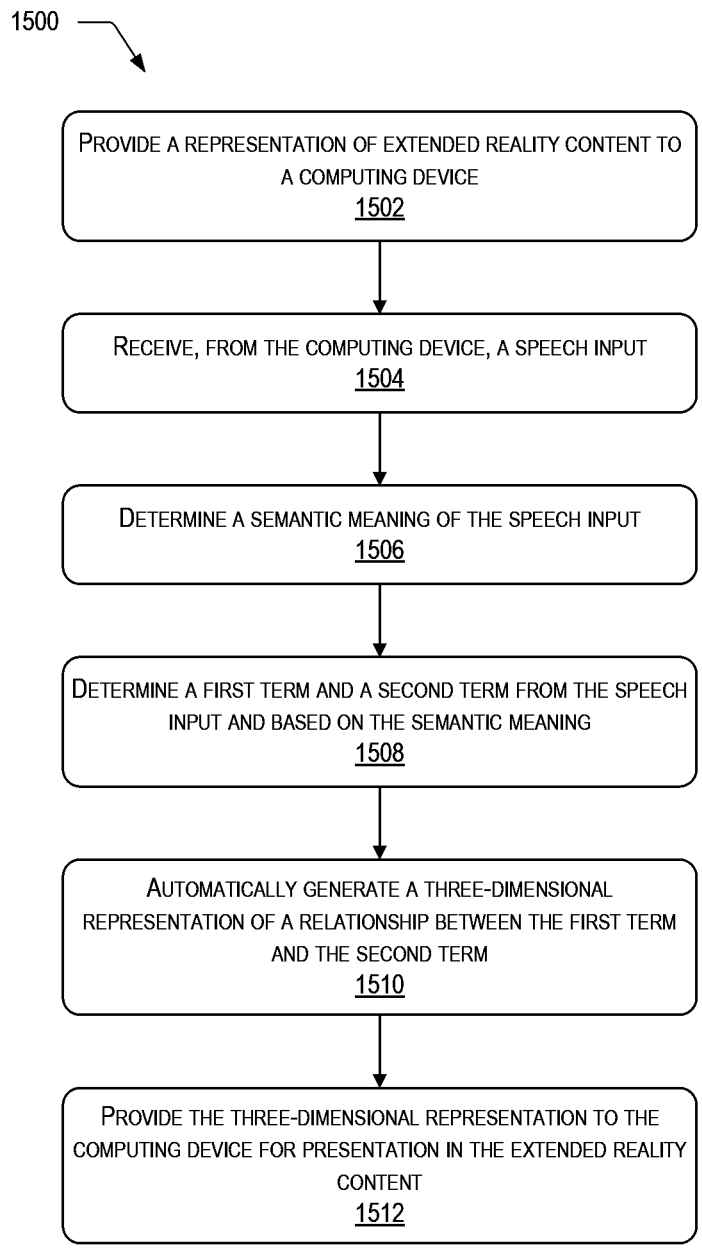
FIG. 15 illustrates a flowchart outlining an example method for visually representing relationships in an environment based on an input using the techniques described herein.

FIG. 15 illustrates an example process 1500 outlining an example method for visually representing relationships in an environment based on an input using the techniques described herein. Various methods are described with reference to the example system of FIG. 1 for convenience and ease of understanding. However, the methods described are not limited to being performed using the systems of FIG. 1 or FIG. 16, and may be implemented using systems and devices other than those described herein.

The method described herein represents a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. In some examples, one or more operations of the method may be omitted entirely. Moreover, the method described herein can be combined in whole or in part with other methods.

An operation 1502 includes providing a representation of extended reality content to a computing device. For example, the extended reality content may be part of an extended reality environment that includes a VR environment, an AR environment, and/or an MR environment. The extended reality content may be presented by any of the computing devices 112 via an application 116.

An operation 1504 includes receiving, from the computing device, a speech input. In some examples, the computing device 112(A) may include one or more microphones to capture sounds of an environment surrounding the computing device 112(A). The computing device 112(A) may transmit a signal corresponding to the sound captured by the microphone(s) to the language processing component 118. In examples, the language processing component 118 may determine that the sound represented by the signal includes speech, and may use such speech as the speech input.

An operation 1506 incudes determining a semantic meaning of the speech input. To determine the semantic meaning, the language processing component 118 may leverage one or more machine-learned models. For instance, the language processing component 118 may input the speech input (and/or a transcription thereof) into a deep neural network, where the deep neural network is trained to determine a semantic meaning of the speech input. In some cases, the deep neural network may also determine a context of multiple speech inputs, such as during a conversation between users of multiple of the computing devices 112 during a shared extended reality session. The language processing component 118 may also use information such as which application 116 the computing device 112(A) is operating when the speech input is received to assist in determining the semantic meaning, such as an application that allows a user to create and/or modify the extended reality environment, a brainstorming application that allows the user to generate a mind map, and so forth.

An operation 1508 includes determining a first term and a second term from the speech input and based on the semantic meaning. For instance, in the case of the computing device 112(A) executing a brainstorming application, the language processing component 118 determines relationships between concepts to be included in a mind map. Alternatively or additionally, in the case of the computing device 112(A) executing an application that enables a user to create and/or modify an environment, the language processing component 118 determines relationships between one or more objects in the speech input and modifications to attributes of the one or more objects.

An operation 1510 includes automatically generating a 3D representation of a relationship between the first term and the second term. In examples, the language processing component 118 provides the terms to one or more of the object manipulation component 120, the mind map component 122, or the timeline component 124 to automatically generate a 3D visual representation of the relationship between the terms. For instance, the object manipulation component 120 may receive an indication of an object in an extended reality environment as a first term, and an action to manipulate the object as a second term. Based on the first term and the second term, the object manipulation component 120 generates the representation of the action to be performed relative to the object in three dimensions in the extended reality environment.

Alternatively or additionally, the mind map component 122 may receive an indication of a concept of a mind map as a first term, and a sub-concept related to the concept as a second term. Based on the first term and the second term, the mind map component 122 generates the representation of the sub-concept relative to the concept in three dimensions in the extended reality environment. In some instances, the timeline component 124 may receive terms related to a search of one or more recordings, where the terms in the search may include terms that were spoken during an extended reality session, a name of a participant in an extended reality session, and so forth. Based on the terms, the timeline component 124 generates a representation of a portion of a recording of an extended reality session that focuses on the terms, such as by highlighting, spotlighting, and so forth.

An operation 1512 includes providing the 3D representation to the computing device for presentation in the extended reality content. For example, the 3D representation component 108 may provide a visual representation of a modification to an object in the extended reality environment based on the terms identified in the speech input. Alternatively or additionally, the 3D representation component 108 may provide a visual representation of creation or modification to a mind map in the extended reality environment based on the terms identified in the speech input. In response to a search input, the 3D representation component 108 may provide a visual representation of a portion of a recording of an extended reality session that focuses on what the user searched for in the search input. In this way, the user can control the extended reality content in an extended reality environment in various ways using speech inputs, and without having to navigate through menus limited to control with handheld controllers to control the extended reality environment.

Example System and Device

Figure 16:
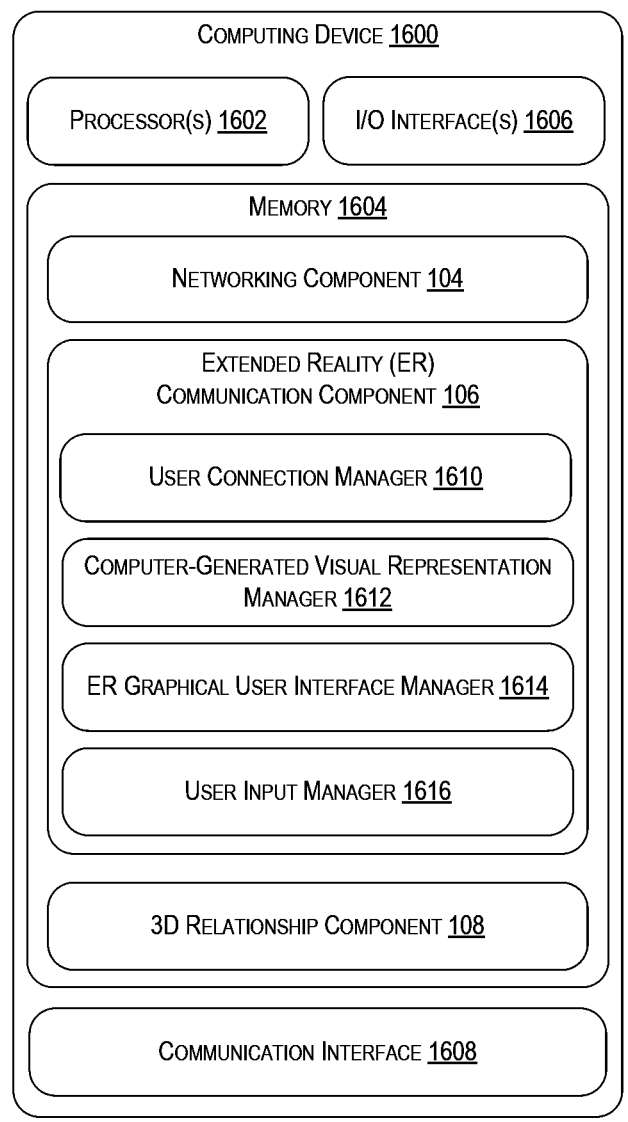
FIG. 16 is an example system and device that is usable to implement the techniques described herein.

FIG. 16 illustrates an example computing device 1600 usable to implement techniques such as those described herein. The computing device 1600 may be representative of the host computing device 102, the third-party services 110, and/or the computing devices 112. As shown, the computing device 1600 includes one or more processors 1602, memory 1604, input/output interfaces 1606 (or "I/O interfaces 1606"), and a communication interface 1608, which may be communicatively coupled to one another by way of a communication infrastructure (e.g., a bus, traces, wires, etc.). While the computing device 1600 is shown in FIG. 16 having a particular configuration, the components illustrated in FIG. 16 are not intended to be limiting. The various components can be rearranged, combined, and/or omitted depending on the requirements for a particular application or function. Additional or alternative components may be used in other examples.

In some examples, the processor(s) 1602 may include hardware for executing instructions, such as those making up a computer program or application. For example, to execute instructions, the processor(s) 1602 may retrieve (or fetch) the instructions from an internal register, an internal cache, the memory 1604, or other computer-readable media, and decode and execute them. By way of example and not limitation, the processor(s) 1602 may comprise one or more central processing units (CPUs), graphics processing units (GPUs), holographic processing units, microprocessors, microcontrollers, integrated circuits, programmable gate arrays, or other hardware components usable to execute instructions.

The memory 1604 is an example of computer-readable media and is communicatively coupled to the processor(s) 1602 for storing data, metadata, and programs for execution by the processor(s) 1602. In some examples, the memory 1604 may constitute non-transitory computer-readable media such as one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1604 may include multiple instances of memory, and may include internal and/or distributed memory. The memory 1604 may include removable and/or non-removable storage. The memory 1604 may additionally or alternatively include one or more hard disk drives (HDDs), flash memory, Universal Serial Bus (USB) drives, or a combination these or other storage devices.

As shown, the computing device 1600 includes one or more I/O interfaces 1606, which are provided to allow a user to provide input to (such as touch inputs, gesture inputs, key strokes, voice inputs, etc.), receive output from, and otherwise transfer data to and from the computing device 1600. Depending on the particular configuration and function of the computing device 1600, the I/O interface(s) 1606 may include one or more input interfaces such as keyboards or keypads, mice, styluses, touch screens, cameras, microphones, accelerometers, gyroscopes, inertial measurement units, optical scanners, other sensors, controllers (e.g., handheld controllers, remote controls, gaming controllers, etc.), network interfaces, modems, other known I/O devices or a combination of such I/O interface(s) 1606. Touch screens, when included, may be activated with a stylus, finger, thumb, or other object. The I/O interface(s) 1606 may also include one or more output interfaces for presenting output to a user, including, but not limited to, a graphics engine, a display (e.g., a display screen, projector, holographic display, etc.), one or more output drivers (e.g., display drivers), one or more audio speakers, and one or more audio drivers. In certain examples, I/O interface(s) 1606 are configured to provide graphical data to a display for presentation to a user. The graphical data may be representative of one or more graphical user interfaces and/or any other graphical content as may serve a particular implementation. By way of example, the I/O interface(s) 1606 may include or be included in a wearable device, such as a head-mounted display (e.g., headset, glasses, helmet, visor, etc.), a suit, gloves, a watch, or any combination of these, a handheld computing device (e.g., tablet, phone, handheld gaming device, etc.), a portable computing device (e.g., laptop), or a stationary computing device (e.g., desktop computer, television, set top box, a vehicle computing device). In some examples, the I/O interface(s) 1606 may be configured to provide an extended reality environment or other computer-generated environment.

The computing device 1600 also includes the communication interface 1608. The communication interface 1608 can include hardware, software, or both. The communication interface 1608 provides one or more interfaces for physical and/or logical interfaces for communication (such as, for example, packet-based communication) between the computing device 1600 and one or more other computing devices or one or more networks. As an example, and not by way of limitation, the communication interface 1608 may include a network interface controller (NIC) or network adapter for communicating with an Ethernet or other wire-based network and/or a wireless NIC (WNIC) or wireless adapter for communicating with a wireless network, such as a WI-FI adapter. The communication interface 1608 can additionally include a bus, which can include hardware (e.g., wires, traces, radios, etc.), software, or both that communicatively couple components of computing device 1600 to each other.

FIG. 16 illustrates the networking component 104, the extended reality communication component 106, and the 3D relationship component 108 implemented by the computing device 1600 (e.g., the host computing devices 102, third-party computing device, and/or one or more of the computing devices 112 as discussed above with reference to FIG. 1). As shown, the networking component 104, the extended reality communication component 106, and the 3D relationship component 108 are stored in the memory 1604 of the computing device 1600. Each of these components, the networking component 104, the extended reality communication component 106, and the 3D relationship component 108, may include computer-executable instructions that are executable by the one or more processors 1602. While shown as separate components in this example, in other examples, the networking component 104, the extended reality communication component 106, and/or the 3D relationship component 108 may be combined with one another or grouped in other manners. For instance, in some examples, the networking component 104, the extended reality communication component 106, and the 3D relationship component 108 may all be parts of a single application or computer program. As another example, the extended reality communication component 106 may be part of the networking component 104, and/or the 3D relationship component 108 may be part of the extended reality communication component 106.

In the illustrated example, the extended reality communication component 106 can include a user connection manager 1610, a computer-generated visual representation manager 1612, an extended reality ("ER") graphical user interface manager 1614, and a user input manager 1616. Also, while not shown, the memory 1604 may store data, such as computer-generated visual representations, a social graph or other representation of user connections, user profiles, and/or task profiles associated with the extended reality communication component 106.

The user connection manager 1610 can determine connections between a user of a networking component and one or more other users of the networking system. For example, the user connection manager 1610 can determine a connection based on a task associated with the user and a task associated with the co-user, recent communications between the user and the co-user, and/or an organizational structure corresponding to an organization associated with the user and the co-user. In some examples, the user connections may be stored and/or represented in the form of a social graph.

The computer-generated visual representation manager 1612 can identify one or more computer-generated visual representations to be displayed on an extended reality device. For example, the computer-generated visual representation manager 1612 can identify animated visual representations (e.g., avatars), photographs, holograms, or other computer-generated visual representations that correspond to other users determined to have a connection with the user by the user connection manager 1610. In some examples, the computer-generated visual representation manager 1612 may also provide computer-generated visual representations for display within or in association with the 3D relationship component 108.

The extended reality communication component 106 further includes the extended reality graphical user interface manager 1614, which provides visual elements for display within an extended reality graphical user interface displayed on an extended reality device. For example, the extended reality graphical user interface manager 1614 can provide one or more extended reality lobby graphical user interface elements. Further, the extended reality graphical user interface manager 1614 can provide one or more computer-generated visual representations selected by the computer-generated visual representation manager 1612 for display within the extended reality lobby graphical user interface element(s). In some examples, the extended reality graphical user interface manager 1614 may also provide visual elements for display within or in association with the 3D relationship component 108.

Additionally, the extended reality communication component 106 includes the user input manager 1616, which can receive or otherwise detect user input. For example, the user input manager 1616 can receive voice input, touch input, eye tracking input, gesture input (e g, hand tracking, head tracking, body language, facial expressions, etc.), and/or input via a controller device associated with the extended reality communication component 106. In some instances, the user input manager 1616 communicates the received user input with the extended reality graphical user interface manager 1614 so that the extended reality graphical user interface manager 1614 can change the visual elements provided for display on the extended reality device. In some examples, user input received via the user input manager 1616 may also be used in association with the 3D relationship component 108.

As discussed above with reference to FIG. 1, the 3D relationship component 108 is configured to receive a speech input from a computing device (e.g., the computing device 102(A) of FIG. 1), and generate a visual representation of terms included in the speech input. For example, the language processing component 118 of the 3D relationship component 108 determines a semantic meaning of the speech input, and identifies terms in the speech input based on the semantic meaning. The language processing component 118 may identify the terms based on parts of speech, such as nouns included in the speech input that may correspond to objects in an extended reality environment and verbs that may correspond to actions associated with the identified nouns. The language processing component 118 may utilize a machine-learned model, such as a deep neural network, to determine the semantic meaning and/or to identify the terms.

Once the terms are identified, the 3D relationship component 108 may generate a 3D representation of a relationship between the terms, and provide the 3D representation to a computing device for display. In some instances, the 3D relationship component 108 generates a 3D representation of a modification to an object in an extended reality environment using the object manipulation component 120. Alternatively or additionally, the 3D relationship component 108 generates a 3D representation of a concepts and sub-concepts in a mind map in an extended reality environment using the mind map component 122. In examples, the 3D relationship component 108 generates a searchable timeline using the terms provided in the speech input and a recording of an extended reality session using the timeline component 124 as well.

Also, as discussed above, the memory 1604 may store, among other things, computer-generated visual representations, user connections, an object library of virtual objects, and/or task profiles. In some examples, the computer-generated visual representations can include visual representations (e.g., animations, photographs, holograms, etc.) that correspond to the users of the networking component. The computer-generated visual representations may be selectable by the computer-generated visual representation manager 1612 for display in association with the networking component 104, the extended reality communication component 106, the 3D relationship component 108, or any other application of the computing device 1600. The user connections can store associations determined between users of the networking component 104 by the user connection manager 1610. In examples, the memory 1604 can store task profiles generated for the users of the networking component 104. The user connection manager 1610 can utilize the stored task profiles to determine connections between users in some instances. Though not shown, the memory 1604 can store various other forms of digital data such as, but not limited to, a social graph, user profiles, digital objects or messages that are passed from one user of a networking component to a co-user of the networking system, or the like.

While in this example, various components and/or managers are shown as being stored in the memory 1604, it should be understood that this is but one example and that the functionality described herein as being attributable to these components and/or managers can be implemented in software, hardware, or both. For example, any or all of these components and/or managers can include one or more instructions stored on a computer-readable storage medium and executable by processors of one or more computing devices, such as the host computing device 102, the third-party service 110, and/or one or more of the computing devices 112. When executed by the one or more processors, the computer-executable instructions of the extended reality communication component 106 can cause the computing device(s) to perform the methods described herein. Alternatively or additionally, the components and/or managers can include hardware, such as a special-purpose processing device to perform a certain function or group of functions. In some cases, the components and/or managers can include a combination of computer-executable instructions and hardware.

Furthermore, in some examples, any or all of the components and/or managers can be implemented as one or more operating systems, as one or more stand-alone applications, as one or more modules of an application, as one or more plug-ins, as one or more library functions application programming interfaces (APIs) that may be called by other applications, and/or as a cloud-computing model. In some instances, the components and/or managers of the networking component 104, the extended reality communication component 106, and/or the 3D relationship component 108 can each be implemented as a stand-alone application, such as a desktop or mobile application, as one or more web-based applications hosted on a remote server, and/or as one or more mobile device applications or "apps."

CONCLUSION

Although the discussion above sets forth example implementations of the described techniques, other architectures may be used to implement the described functionality, and are intended to be within the scope of this disclosure.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
providing a representation of extended reality content to a first computing device associated with a first user;
receiving, from the first computing device, a first speech input spoken by the first user;
determining a first semantic meaning of the first speech input;
receiving, from a second computing device, a second speech input spoken by a second user;
determining a second semantic meaning of the second speech input;
determining a first term from the first speech input and based at least in part on the first semantic meaning;
determining a second term from the first speech input and based at least in part on the first semantic meaning;
automatically generating, based at least in part on the second semantic meaning of the second speech input, a three-dimensional representation of a relationship between the first term and the second term; and
providing the three-dimensional representation to the first computing device for presentation in the extended reality content.

2. The method of claim 1, wherein the extended reality content comprises computer-generated content configured to be presented in association with at least one of a virtual reality (VR) environment, an augmented reality (AR) environment, or a mixed reality (MR) environment.

3. The method of claim 1, wherein the extended reality content includes an object, the method further comprising:
associating the first term and the second term with the object; and
modifying, as a modified object, the object based at least in part on the first term and the second term,
wherein generating the three-dimensional representation is based at least in part on the modified object.

4. The method of claim 3, further comprising:
receiving, from the first computing device, an indication of a direction of a gaze or of a pose of a user relative to the extended reality content; and
determining that the object is in a path associated with the direction of the gaze or of the pose,
wherein associating the first term and the second term with the object is based at least in part on determining that the object is in the path associated with the direction of the gaze or of the pose.

5. The method of claim 3, wherein at least one of the first term or the second term refers to a portion of the object, and wherein a different one of the first term or the second term refers to a modification of the portion of the object.

6. The method of claim 1, wherein the three-dimensional representation comprises a mind map based on a central concept associated with the first term and a sub-concept associated with the second term, and wherein the three-dimensional representation visually distinguishes the central concept from the sub-concept.

7. The method of claim 6, wherein the sub-concept is a first sub-concept, the method further comprising:
determining a third term from the first speech input based at least in part on the first semantic meaning;
determining a second sub-concept associated with the third term, the second sub-concept being different than the first sub-concept; and
modifying the mind map to include the second sub-concept such that the three-dimensional representation visually distinguishes the second sub-concept from the central concept and the first sub-concept.

8. The method of claim 6, further comprising:
determining an object or an audio clip associated with the central concept or the sub-concept,
wherein generating the three-dimensional representation comprises incorporating the object or the audio clip into the mind map at a location associated with the central concept or the sub-concept on the mind map.

9. The method of claim 1, further comprising:
determining a first time associated with the first term in the first speech input;
determining a second time associated with the second term in the first speech input;
generating a timeline based at least in part on the first time and the second time; and
causing presentation of the timeline in association with the three-dimensional representation.

10. The method of claim 9, further comprising:
generating a recording associated with at least the first term and a user of the first computing device;
receiving, from the first computing device or the second computing device, a search input comprising a search term;
associating the search term with at least one of the first term or the user; and
providing, to the first computing device or the second computing device from which the search input was received and in response to receiving the search input, the recording to be presented via the first computing device or the second computing device from which the search input was received.

11. A system comprising:
one or more processors; and
one or more computer-readable media storing instructions that, when executed by the one or more processors, cause the one or more processors to perform operations comprising:
providing a representation of extended reality content to a computing device;
receiving, from the computing device, a speech input;
determining a semantic meaning of the speech input;
determining a first term from the speech input and based at least in part on the semantic meaning;
determining a second term from the speech input and based at least in part on the semantic meaning;
automatically generating a three-dimensional representation of a relationship between the first term and the second term;
determining a first time associated with the first term in the speech input;
determining a second time associated with the second term in the speech input;
generating a timeline based at least in part on the first time and the second time; and
causing presentation of the timeline in association with the three-dimensional representation; and
providing the three-dimensional representation to the computing device for presentation in the extended reality content.

12. The system of claim 11, wherein the extended reality content includes an object, the operations further comprising:
   associating the first term and the second term with the object; and
   modifying, as a modified object, the object based at least in part on the first term and the second term,
   wherein generating the three-dimensional representation is based at least in part on the modified object.

13. The system of claim 12, the operations further comprising:
   receiving, from the computing device, an indication of a direction of a gaze of a user relative to the extended reality content; and
   determining that the object is in a path associated with the direction of the gaze,
   wherein associating the first term and the second term with the object is based at least in part on determining that the object is in the path associated with the direction of the gaze.

14. The system of claim 12, wherein at least one of the first term or the second term refers to a portion of the object, and wherein a different one of the first term or the second term refers to a modification of the portion of the object.

15. One or more non-transitory computer-readable media storing instructions that, when executed by one or more processors, cause the one or more processors to perform operations comprising:
   providing a representation of extended reality content to a computing device;
   receiving, from the computing device, a speech input;
   determining a semantic meaning of the speech input;
   determining a first term from the speech input and based at least in part on the semantic meaning;
   determining a second term from the speech input and based at least in part on the semantic meaning;
   automatically generating a three-dimensional representation of a relationship between the first term and the second term, wherein the three-dimensional representation comprises a mind map based on a central concept associated with the first term and a sub-concept associated with the second term, and wherein the three-dimensional representation visually distinguishes the central concept from the sub-concept; and
   providing the three-dimensional representation to the computing device for presentation in the extended reality content.

16. The one or more non-transitory computer-readable media of claim 15, wherein the sub-concept is a first sub-concept, the operations further comprising:
   determining a third term from the speech input based at least in part on the semantic meaning;
   determining a second sub-concept associated with the third term, the second sub-concept being different than the first sub-concept; and
   modifying the mind map to include the second sub-concept such that the three-dimensional representation visually distinguishes the second sub-concept from the central concept and the first sub-concept.

17. The one or more non-transitory computer-readable media of claim 15, the operations further comprising:
   determining an object associated with the central concept or the sub-concept,
   wherein generating the three-dimensional representation comprises incorporating the object into the mind map at a location associated with the central concept or the sub-concept on the mind map.

18. The one or more non-transitory computer-readable media of claim 15, wherein the extended reality content includes an object, the operations further comprising:
   associating the first term and the second term with the object; and
   modifying, as a modified object, the object based at least in part on the first term and the second term,
   wherein generating the three-dimensional representation is based at least in part on the modified object.

19. The one or more non-transitory computer-readable media of claim 18, the operations further comprising:
   receiving, from the computing device, an indication of a direction of a gaze or of a pose of a user relative to the extended reality content; and
   determining that the object is in a path associated with the direction of the gaze or of the pose,
   wherein associating the first term and the second term with the object is based at least in part on determining that the object is in the path associated with the direction of the gaze or of the pose.

20. The one or more non-transitory computer-readable media of claim 15, the operations further comprising:
   determining a first time associated with the first term in the speech input;
   determining a second time associated with the second term in the speech input;
   generating a timeline based at least in part on the first time and the second time; and
   causing presentation of the timeline in association with the three-dimensional representation.

* * * * *